(12) United States Patent
Zhao et al.

(10) Patent No.: US 12,372,657 B2
(45) Date of Patent: Jul. 29, 2025

(54) TOF APPARATUS AND ELECTRONIC DEVICE

(71) Applicant: HUAWEI TECHNOLOGIES CO., LTD., Guangdong (CN)

(72) Inventors: Ziang Zhao, Shenzhen (CN); Kewei Jiang, Tokyo (JP); Na Wang, Shenzhen (CN); Shaogang Zhang, Shanghai (CN); Weiwei Yu, Shenzhen (CN); Wei Tang, Tokyo (JP); Jun Yuan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 45 days.

(21) Appl. No.: 18/256,535

(22) PCT Filed: Dec. 7, 2021

(86) PCT No.: PCT/CN2021/135992
§ 371 (c)(1),
(2) Date: Jun. 8, 2023

(87) PCT Pub. No.: WO2022/121879
PCT Pub. Date: Jun. 16, 2022

(65) Prior Publication Data
US 2024/0053479 A1    Feb. 15, 2024

(30) Foreign Application Priority Data

Dec. 9, 2020  (CN) .......................... 202011431118.1

(51) Int. Cl.
*G01S 17/894*    (2020.01)
*G01S 7/481*     (2006.01)
(Continued)

(52) U.S. Cl.
CPC .......... *G01S 17/894* (2020.01); *G01S 7/4815* (2013.01); *H04N 13/211* (2018.05); *H04N 23/56* (2023.01); *H04N 23/74* (2023.01)

(58) Field of Classification Search
CPC ...... G01S 17/10; G01S 17/894; G01S 7/4815; G01S 7/4816; G01S 7/484; G01S 7/4863;
(Continued)

(56) References Cited

U.S. PATENT DOCUMENTS

2015/0286159 A1   10/2015   Yamazaki
2020/0092533 A1   3/2020    Narasimhan et al.
(Continued)

FOREIGN PATENT DOCUMENTS

CN    102131051 A    7/2011
CN    103747186 A    4/2014
(Continued)

OTHER PUBLICATIONS

International Search Report and Written Opinion in International Appln. No. PCT/CN2021/135992, mailed on Mar. 1, 2022, 17 pages (with English translation).
(Continued)

*Primary Examiner* — Masum Billah
(74) *Attorney, Agent, or Firm* — Fish & Richardson P.C.

(57) ABSTRACT

This application discloses a time of flight (TOF) apparatus and an electronic device comprising the TOF apparatus. The TOF apparatus includes a transmitter and a receiver, and both the transmitter and the receiver are divided into a plurality of regions. The TOF apparatus can capture a plurality of local 3D images corresponding to different regions of a target object in a manner in which the transmitter performs region-based turning-on and the receiver performs region-based detection, and then the electronic
(Continued)

device splices the plurality of local 3D images, to obtain a 3D image of the target object.

16 Claims, 17 Drawing Sheets

(51) Int. Cl.
*H04N 13/211* (2018.01)
*H04N 23/56* (2023.01)
*H04N 23/74* (2023.01)

(58) Field of Classification Search
CPC ... G01S 7/4865; G01S 7/4868; H04N 13/211; G02F 1/133611; G02F 1/133603; G02F 1/133605; G02F 1/133606; G02F 1/133608; G02F 1/133607; G02F 1/133615; G09F 9/33
USPC .......................................................... 348/46
See application file for complete search history.

(56) References Cited

U.S. PATENT DOCUMENTS

| | | |
|---|---|---|
| 2020/0284883 A1 | 9/2020 | Ferreira et al. |
| 2022/0303443 A1 | 9/2022 | Wei et al. |

FOREIGN PATENT DOCUMENTS

| | | | | |
|---|---|---|---|---|
| CN | 103780844 A | | 5/2014 | |
| CN | 106574964 A | | 4/2017 | |
| CN | 208300111 U | | 12/2018 | |
| CN | 110285788 A | | 9/2019 | |
| CN | 110312074 A | | 10/2019 | |
| CN | 110381244 A | | 10/2019 | |
| CN | 110456379 A | | 11/2019 | |
| CN | 110620878 A | | 12/2019 | |
| CN | 111123292 A | | 5/2020 | |
| CN | 111246073 A | | 6/2020 | |
| CN | 111327835 A | | 6/2020 | |
| CN | 210725133 U | | 6/2020 | |
| CN | 111366906 A | * | 7/2020 | |
| CN | 111398977 A | | 7/2020 | |
| CN | 111458693 A | | 7/2020 | |
| CN | 211321384 U | * | 8/2020 | ........... G01S 17/894 |
| CN | 111950539 A | | 11/2020 | |
| CN | 112038361 A | | 12/2020 | |
| JP | 2001159705 A | | 6/2001 | |
| JP | 2020043229 A | | 3/2020 | |

OTHER PUBLICATIONS

European Search Report in European Appln. No. 21902584.8, mailed on Mar. 18, 2024, 9 pages.

* cited by examiner

TOF APPARATUS AND ELECTRONIC DEVICE

CROSS-REFERENCE TO RELATED APPLICATIONS

This application is a national stage of International Application No. PCT/CN2021/135992, filed on Dec. 7, 2021, which claims priority to Chinese Patent Application No. 202011431118.1, filed on Dec. 9, 2020. Both of the aforementioned applications are hereby incorporated by reference in their entireties.

TECHNICAL FIELD

This application relates to the field of optoelectronic device technologies, and in particular, to a TOF apparatus and an electronic device.

BACKGROUND

Currently, a three-dimensional (three-dimensional, 3D) camera of an electronic device mainly uses a time of flight (time of flight, TOF) apparatus, and the TOF apparatus obtains a 3D image of a target object by using a time of flight technology. The TOF apparatus includes a transmitter (transmitter, which may also be referred to as a projector) and a receiver (receiver). The transmitter is configured to emit an optical signal to the target object. After being reflected by the target object, the optical signal may be received by the receiver. A distance between the target object and the TOF apparatus may be determined based on a time of flight of the optical signal between the transmitter and the receiver.

A detection distance of the TOF apparatus is related to a peak current of the transmitter of the TOF apparatus. A larger peak current provided by the electronic device indicates that the TOF apparatus can have a longer detection distance. However, a power supply of a mobile electronic device (which may also be referred to as a mobile terminal) such as a mobile phone usually cannot provide a large peak current for the TOF apparatus. Consequently, the detection distance of the TOF apparatus is limited, and it is difficult to satisfy increasingly diversified application requirements of the electronic device.

SUMMARY

An objective of this application is to provide a TOF apparatus and an electronic device having the TOF apparatus, where the TOF apparatus can implement long-distance detection.

According to a first aspect, this application provides a TOF apparatus. The TOF apparatus may be used in an electronic device as a 3D camera. The TOF apparatus includes a transmitter and a receiver.

The transmitter includes a light source, a drive chip, and an optical element. The light source includes a plurality of light emitting units. The plurality of light emitting units may work independently. The drive chip is electrically connected to plurality of light emitting units, and the drive chip is configured to turn on the plurality of light emitting units in turn according to a specific time sequence. The optical element is located on light emitting paths of the plurality of light emitting units. The optical element is configured to enable light emitted by the plurality of light emitting units to form a plurality of projection fields of view in a one-to-one correspondence, and the plurality of projection fields of view are for covering a target object.

The receiver includes a camera lens and an image sensor. The camera lens is configured to receive light reflected by the target object and form a plurality of sensing fields of view. The plurality of sensing fields of view are in a one-to-one correspondence with the plurality of projection fields of view. The image sensor is located on a light emitting side of the camera lens. The image sensor includes a plurality of light sensing units and a logic control circuit. The plurality of sensing fields of view cover the plurality of light sensing units in a one-to-one correspondence. The plurality of light sensing units may work independently. The logic control circuit is configured to start the plurality of light sensing units in turn according to a specific time sequence, and a start time sequence of each light sensing unit is the same as a turn-on time sequence of a corresponding light emitting unit. A started light sensing unit can convert an optical signal into an electrical signal.

In this application, the TOF apparatus uses a manner of region-based turning-on and region-based detection, and detects local regions of the target object for a plurality of times, to detect all regions of the target object. Therefore, a peak current can be effectively shared in the plurality of times of detection of the TOF apparatus, and each detection process of the TOF apparatus can be implemented by using only a low peak current. Therefore, when the electronic device can provide a specific peak current, the TOF apparatus can implement detection at a longer distance, and the TOF apparatus and the electronic device have a wider detection range and may also be better applicable to indoor environment and outdoor environment detection. In addition, an effective power per unit area of the TOF apparatus is also high, which helps improve a resolution of the TOF apparatus, so that the TOF apparatus implements high-resolution detection.

In this application, the TOF apparatus obtains 3D contour information of a plurality of detection regions of the target object in a manner in which the transmitter performs region-based turning-on and the receiver performs region-based detection. The TOF apparatus is electrically connected to a processor of the electronic device. The processor can form a local 3D image of the target object based on the 3D contour information of each detection region, and then obtain a 3D image of the target object by splicing a plurality of local 3D images. In other words, the processor can form the 3D image of the target object based on an output signal of the TOF apparatus.

In a possible implementation, the target object has a plurality of detection regions, and the TOF apparatus obtains the 3D contour information of the plurality of detection regions respectively through a plurality of times of detection. In a detection process, a light emitting unit of the transmitter repeatedly flashes for thousands of times at a fixed frequency, and a corresponding light sensing unit of the image sensor of the receiver is continuously in a started state, to complete exposure of a corresponding detection region. The receiver sends a plurality of time-of-flight distribution histograms to the processor of the electronic device. Then, next detection is started until exposure of the plurality of detection regions of the target object is completed. The processor forms the local 3D image of the detection region according to the time-of-flight distribution histogram formed during each exposure, and then splices the plurality of local 3D images to form the 3D image of the target object, to complete detection and capturing of a frame of image.

In a possible implementation, a process in which the TOF apparatus of the electronic device detects one detection region of the target object may include 1 k to 10 k flash detection processes. One flash detection process may include: The light emitting unit emits a first pulse; the light sensing unit is in the started state and the light sensing unit converts an optical signal sensed by the light sensing unit into an electrical signal and outputs the electrical signal; and a data storage and conversion circuit receives the electrical signal, and the data storage and conversion circuit processes and stores data. After the TOF apparatus completes the 1 k to 10 k flash detection processes, the data storage and conversion circuit sends the time-of-flight histogram to the processor of the electronic device, so that a detection process is performed.

A pulse width of a pulse of the light emitting unit may be within a range from 1 nanosecond to 5 nanoseconds.

A plurality of time-of-flight histograms are output in each detection process, and the plurality of time-of-flight histograms are in a one-to-one correspondence with a plurality of single-photon detectors in one light sensing unit. The processor can form, based on the plurality of time-of-flight histograms, a local 3D image of the target object corresponding to the light sensing unit.

In a possible implementation, the TOF apparatus may sequentially detect the plurality of detection regions according to a specific time sequence. In each detection process, a corresponding time-of-flight histogram is output to the processor. The processor forms the local 3D image of the target object based on the time-of-flight histogram, and then splices the plurality of local 3D images to form the 3D image of the target object.

In this implementation, the image sensor uses a region-based startup design. Compared with a conventional solution in which the image sensor is started as a whole, in this implementation, a single-photon detector of another light sensing unit in a non-started state of the image sensor can avoid a waste of power consumption caused by incorrect triggering due to ambient light, thereby reducing energy consumption of the receiver. In addition, the image sensor uses the region-based startup design, which also helps to avoid problems such as dark count and crosstalk.

In a possible implementation, there may be 4 to 20 light emitting units. A quantity of light sensing units of the image sensor is the same as a quantity of light emitting units of the light source.

In a possible implementation, the light source is a vertical-cavity surface-emitting laser.

In a possible implementation, each light sensing unit may include a plurality of single-photon detectors.

In a possible implementation, a plurality of light emitting units are arranged in a first direction, each light emitting unit extends in a second direction, and the second direction is perpendicular to the first direction. After passing through the optical element, an angle of view of a single light emitting unit shrinks in the first direction and expands in the second direction. In other words, in the first direction, an angle of view of a projection field of view of the light emitting unit is less than an angle of view of an emission field of view; and in the second direction, the angle of view of the projection field of view of the light emitting unit is greater than the angle of view of the emission field of view.

In a possible implementation, in the first direction, the angle of view of the emission field of view of the light emitting unit may be approximately within a range of 20° to 25°, and the angle of view of the projection field of view may be approximately within a range of 4° to 5°. In the second direction, the angle of view of the emission field of view of the light emitting unit may be approximately within a range of 20° to 25°, and the angle of view of the projection field of view may be approximately within a range of 50° to 60°.

In a possible implementation, after passing through the optical element, the angle of view of the light source expands in the first direction and in the second direction. In other words, in the first direction and the second direction, an angle of view of a total projection field of view of the transmitter is greater than the angle of view of the emission field of view of the light source.

In a possible implementation, angles of view of the plurality of projection fields of view in the first direction are within a range of 65° to 70°, and angles of view of the plurality of projection fields of view in the second direction are within a range of 50° to 60°.

In a possible implementation, two adjacent projection fields of view form two adjacent detection regions on the target object, and the two detection regions are partially staggered and partially overlapped. In this case, an overlapped part of the two adjacent detection regions form redundancy, so that a risk of insufficient detection precision caused by a factor such as an assembly error of the TOF apparatus can be reduced, and a black edge region is avoided at an intersection location of the two adjacent detection regions, so that the TOF apparatus has high detection precision and better imaging quality.

In a possible implementation, a proportion of a staggered part of the two detection regions is greater than a proportion of the overlapped part of the two detection regions. In a possible implementation, the proportion of the overlapped part of the two adjacent detection regions may be approximately within a range of 5% to 20%.

In a possible implementation, the light source and the drive chip are disposed in a stacked manner, and a non-light emitting side of the light source is fastened to the drive chip. In this implementation, the light source and the drive chip are disposed in a stacked manner, and are arranged in a compact manner, which facilitates a miniaturization design of the transmitter and the TOF apparatus.

In a possible implementation, the light source includes an anode pad and a cathode pad, the anode pad is located on a light emitting side of the light source, and the cathode pad is located on the non-light emitting side of the light source. The drive chip includes a first pad and a second pad. The first pad is located on a side of the drive chip close to the light source and is located around the light source. The first pad is connected to the anode pad through a conductive wire. The second pad is located on the side of the drive chip close to the light source and is disposed facing the non-light emitting side of the light source. The second pad is connected to the cathode pad through a conductive adhesive.

In this implementation, the light source and the drive chip are disposed in a stacked manner, so that a wiring distance between the light source and the drive chip also may be greatly reduced (for example, a length of the conductive wire is obviously shortened), thereby effectively improving a light waveform of the light source and ensuring performance of the transmitter.

In a possible implementation, there are a plurality of anode pads, each light emitting unit includes two anode pads, and the two anode pads are respectively located at two ends of the light emitting unit. There are a plurality of first pads, the plurality of first pads are in groups of two, each group of first pads corresponds to one light emitting unit, and two first pads in a same group are respectively located on two sides of a corresponding light emitting unit and are respectively connected to two anode pads of the corresponding light emitting unit.

In this implementation, the anode pad of the light emitting unit of the light source is connected to the first pad of the drive chip by binding conductive wires on both sides, so that the drive chip can simultaneously turn on or nearly simultaneously turn on an entire light emitting region of the light emitting unit, to reduce a detection error caused by uneven turning-on time of the plurality of light emitting units of the transmitter, and improve ranging precision and photographing quality of the TOF apparatus.

In a possible implementation, conduction may be implemented between the corresponding anode pad and the first pad through two conductive wires, to improve reliability of the connection between the anode pad and the first pad.

In a possible implementation, the transmitter further includes a first circuit board assembly, and the first circuit board assembly includes a first circuit board and a first reinforcement plate. The first circuit board has a through hole. The first reinforcement plate is fastened on a side of the first circuit board and covers the through hole, the drive chip is at least partially located in the through hole, and a side of the drive chip away from the light source is fastened on the first reinforcement plate.

In this implementation, an arrangement manner of the drive chip, the light source, and the first circuit board assembly helps reduce a thickness of the transmitter, and implement miniaturization of the TOF apparatus.

In a possible implementation, the logic control circuit is electrically connected to the drive chip, and the logic control circuit includes an instruction module and a drive module. The instruction module is configured to send a turn-on instruction to the drive chip. The turn-on instruction instructs the drive chip to turn on a preset light emitting unit. The drive module is configured to start a preset light sensing unit with a delay of 0.1 ns to 1 ns. The preset light sensing unit corresponds to the preset light emitting unit.

In this implementation, because the logic control circuit of the image sensor controls to start the light sensing unit with a delay of 0.1 ns to 1 ns, the light sensing unit skips a time period in which a crosstalk problem may occur. Therefore, a problem that the image sensor is incorrectly triggered due to short-distance clutter light can be avoided, and a risk of crosstalk occurrence is reduced, to improve the detection precision of the TOF apparatus.

In a possible implementation, the data storage and conversion circuit includes a time-to-digital converter and a memory. The time-to-digital converter is electrically connected to a plurality of light sensing units, and is configured to convert analog signals output by the plurality of light sensing units into digital signals represented by time. The memory is electrically connected to the time-to-digital converter, and is configured to store the digital signals.

In a possible implementation, the logic control circuit and a power supply circuit may be located around a light sensing circuit, and the data storage and conversion circuit may be located on a non-light sensing side of the light sensing circuit, that is, located below the light sensing circuit, and is stacked with the light sensing circuit.

In a possible implementation, a single light sensing unit may include P×Q single-photon detectors, and the time-to-digital converter may include P×Q units, where both P and Q are positive integers. In this case, a quantity of units of the time-to-digital converter corresponds to a quantity of single-photon detectors of the light sensing unit, so that an area of the image sensor can be reduced when a requirement for calculating and buffering depth data is satisfied, thereby facilitating miniaturization of the receiver and the TOF apparatus.

In a possible implementation, the receiver further includes a second circuit board assembly, and the second circuit board assembly includes a second circuit board, a third reinforcement plate, and a plurality of second components. A non-light sensing side of the image sensor is fastened on the second circuit board. The third reinforcement plate is fastened on a side of the second circuit board away from the image sensor, and the third reinforcement plate is provided with one or more vias. The plurality of second components are located in the one or more vias and are fastened on the second circuit board.

In this implementation, the second circuit board assembly uses a component back-mounted design, which helps reduce space occupied by the second circuit board assembly in a direction parallel to a board surface, so that the receiver and the TOF apparatus are more easily miniaturized. The third reinforcement plate may further protect the plurality of second components, prevent collision, and increase structural strength of the circuit board.

Projections of the plurality of second components on the second circuit board at least partially overlap a projection of the image sensor on the second circuit board, to further improve space utilization of the second circuit board assembly, and facilitate miniaturization of the receiver and the TOF apparatus. It may be understood that at least partial overlapping may include two cases: entire overlapping and partial overlapping. The entire overlapping means that a projection of one entirely covers a projection of the other.

According to a second aspect, this application further provides an electronic device, including a processor and any one of the foregoing TOF apparatuses. The processor is electrically connected to the TOF apparatus, and the processor is configured to form a 3D image of a target object based on an output signal of the TOF apparatus.

In this application, the TOF apparatus includes a transmitter and a receiver, and both the transmitter and the receiver are divided into a plurality of regions. The TOF apparatus can capture a plurality of local 3D images corresponding to different regions of the target object in a manner in which the transmitter performs region-based turning-on and the receiver performs region-based detection, and then the electronic device splices the plurality of local 3D images, to obtain the 3D image of the target object.

Because the transmitter uses a region-based turning-on manner and the receiver uses a region-based detection manner, a peak current required when the TOF apparatus captures a single local 3D image is greatly reduced. Therefore, the TOF apparatus can implement detection at a longer distance under a peak current allowed by the electronic device, and a detection range of the TOF apparatus and the electronic device is larger.

DESCRIPTION OF EMBODIMENTS

The following describes technical solutions of embodiments in this application with reference to the accompanying drawings.

In descriptions of embodiments of this application, unless otherwise stated, the term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more. A value range "A to B" includes endpoint values A and B.

Terms such as "first" and "second" below are merely intended for a purpose of description, and shall not be understood as implying or implying relative importance or implicitly indicating a quantity of indicated technical features. Therefore, a feature limited by "first" or "second" may explicitly or implicitly include one or more features.

Orientation terms mentioned in embodiments of this application, for example, "up", "down", "in", "outside", "top", and "bottom", are merely directions with reference to the accompanying drawings. Therefore, the orientation terms are used to better and more clearly describe and understand embodiments of this application, instead of indicating or implying that an indicated apparatus or element needs to have a specific orientation and be constructed and operated in a specific orientation. Therefore, the orientation terms cannot be understood as a limitation on embodiments of this application.

In the descriptions of embodiments of this application, it should be noted that, unless otherwise explicitly specified and defined, terms such as "installation", "connection", and "fastened" should be understood in a broad sense. For example, "connection" may be a detachable connection, or may be an undetachable connection; or the "connection" may be a direct connection, or may be an indirect connection by using an intermediate medium.

Figure 1:
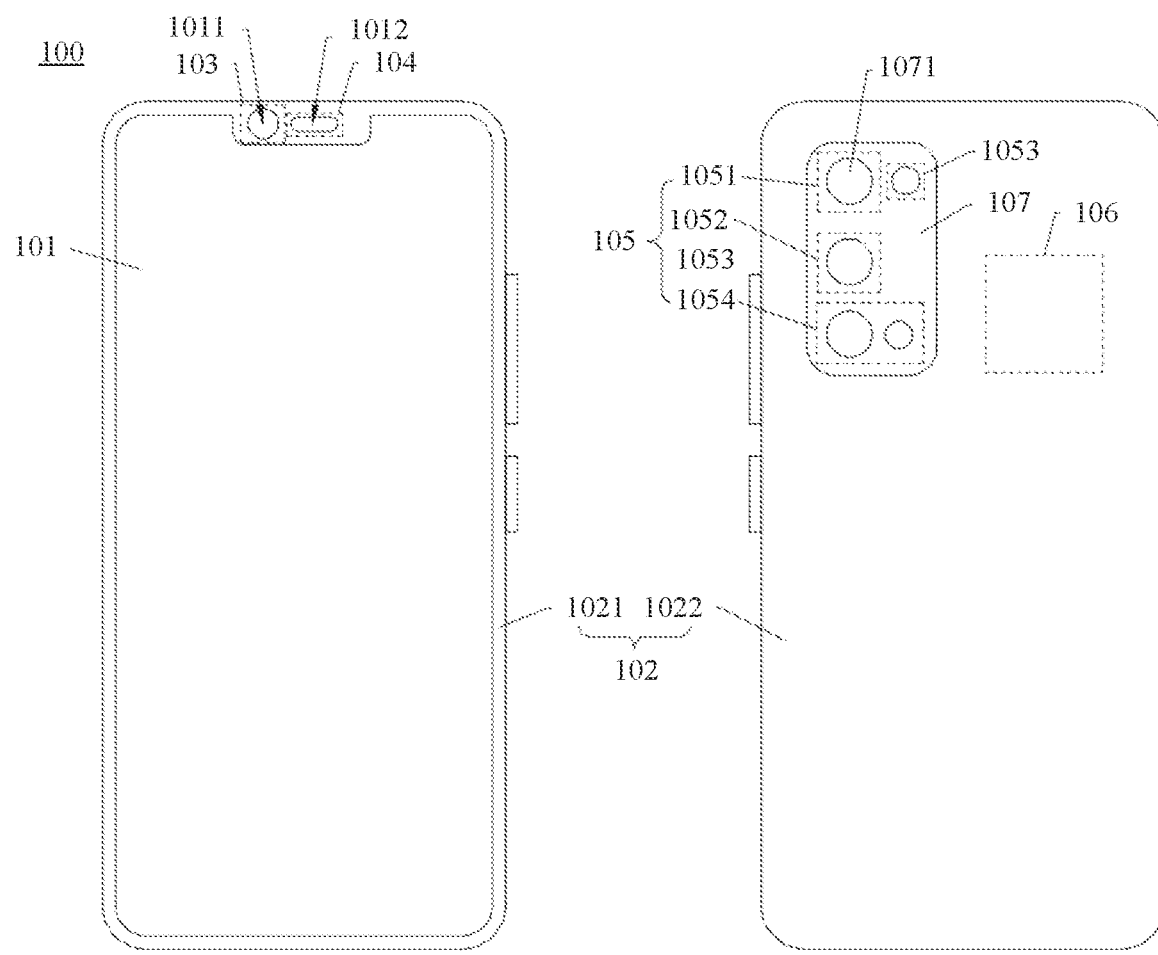
FIG. 1 is a schematic diagram of a structure of an electronic device according to an embodiment of this application.

Refer to FIG. 1. FIG. 1 is a schematic diagram of a structure of an electronic device 100 according to an embodiment of this application.

FIG. 1 shows the structure of the electronic device 100 from two perspectives: a front side and a back side of the electronic device 100. The electronic device 100 may be an electronic device 100 having a shooting or photographing function, for example, a mobile phone, a tablet computer, a television (or a smart screen), a laptop computer, a video camera, a video recorder, or a camera. For ease of understanding, an example in which the electronic device 100 is a mobile phone is used for description in this embodiment of this application.

The electronic device 100 may include a display screen 101 and a housing 102. The housing 102 may include a frame 1021 and a rear cover 1022. The display screen 101 and the rear cover 1022 are separately located on two sides of the frame 1021. The frame 1021 may encircle a periphery of the display screen 101, and the frame 1021 may encircle a periphery of the rear cover 1022. The display screen 101, the frame 1021, and the rear cover 1022 may jointly enclose to form a whole machine inner cavity. The frame 1021 and the rear cover 1022 may form an integrated structure through assembly, or may be an integrally formed structure. The display screen 101 may include a glass cover and a display panel fastened to the glass cover, and the display panel is configured to display an image.

The electronic device 100 may further include a front-facing camera module 103, an earpiece module 104, a rear-facing camera module 105, a processor 106, and the like that are accommodated in the whole machine inner cavity. The processor 106 is electrically connected to the display screen 101, the front-facing camera module 103, the earpiece module 104, and the rear-facing camera module 105.

As shown in a left figure in FIG. 1, for example, the front-facing camera module 103 and the earpiece module 104 may be installed on an upper middle part of the display screen 101. The display screen 101 may be provided with a front-facing camera hole 1011 and an earpiece hole 1012. The front-facing camera module 103 may capture external light of the electronic device 100 through the front-facing camera hole 1011, to take a selfie. The earpiece module 104 may emit sound through the earpiece hole 1012, so that a user can answer a call, make a voice, and the like.

As shown in a right figure in FIG. 1, for example, the rear-facing camera module 105 may be installed on an upper left part of the rear cover 1022. The electronic device 100 may further include a camera decorative member 107. The camera decorative member 107 is installed on the rear cover 1022, and the camera decorative member 107 is provided with a plurality of light through holes 1071. The rear-facing camera module 105 may capture external light through the light through holes 1071 on the camera decorative member 107, to photograph a scene around the electronic device 100.

It may be understood that installation locations of the front-facing camera module 103 and the rear-facing camera module 105 shown in FIG. 1 are merely examples. The installation locations of the camera modules may not be limited in this application. In some other embodiments, the front-facing camera module 103 and the rear-facing camera module 105 may alternatively be installed at other locations on the electronic device 100. For example, the front-facing camera module 103 may be externally installed on an upper left part or an upper right part of the display screen 101. For another example, the rear-facing camera module 105 may be installed on an upper middle part or an upper right part of the rear cover 1022. For another example, the front-facing camera module 103 or the rear-facing camera module 105 may be disposed on a movable component in the electronic device 100. By moving the movable component, the movable component may be hidden inside the electronic device 100, or may extend out of the electronic device 10.

It may be understood that quantities of installed front-facing camera modules 103 and rear-facing camera modules 105 shown in FIG. 1 are merely examples. The quantities of installed camera modules may not be limited in this application. The electronic device 100 may include more or fewer camera modules.

Figure 2:
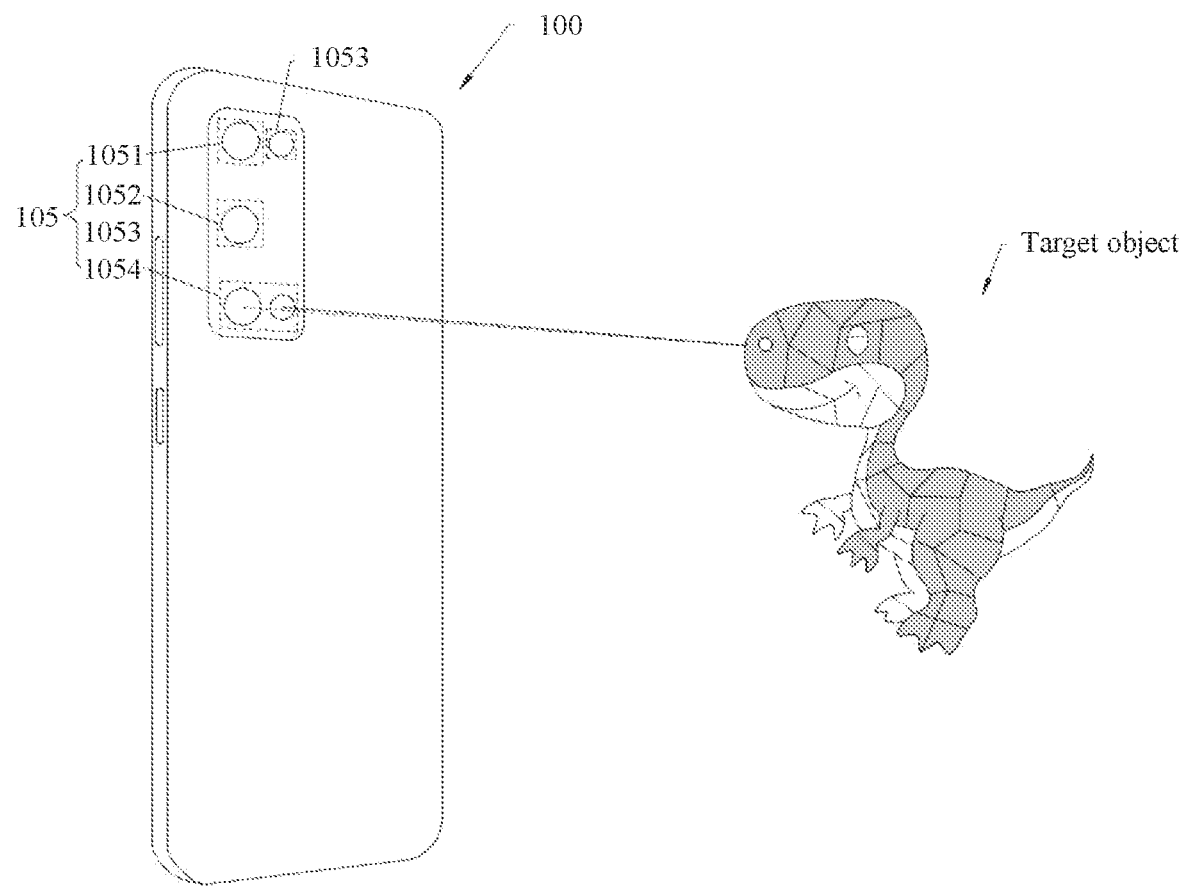
FIG. 2 is a schematic diagram of a structure of the electronic device shown in FIG. 1 in an application scenario.

Refer to FIG. 1 and FIG. 2. FIG. 2 is a schematic diagram of a structure of the electronic device 100 shown in FIG. 1 in an application scenario. For example, the rear-facing camera module 105 may include a primary two-dimensional (two-dimensional, 2D) camera 1051 and a secondary 2D camera 1052. Both the primary 2D camera 1051 and the secondary 2D camera 1052 may be configured to photograph 2D image information such as a 2D contour, a 2D pattern, and a color (and then grayscale, a shade, and the like) of a target object, to obtain a 2D image of the target object. Jointly using the primary 2D camera 1051 and the secondary 2D camera 1052 helps obtain a high-resolution and high-quality 2D image.

For example, the rear-facing camera module 105 may further include, for example, a flash light 1053. The flash light 1053 may be located near the primary 2D camera 1051 or the secondary 2D camera 1052. The flash light 1053 may emit visible light. The flash light 1053 may provide light for the primary 2D camera 1051 and/or the secondary 2D camera 1052. For example, in a night or a scenario with dark light, light emitted by the flash light 1053 may be illuminated on the target object, so that light intensity that is captured by the primary 2D camera 1051 and/or the secondary 2D camera 1052 and that is from the target object can be increased.

For example, the rear-facing camera module 105 may further include a 3D camera 1054. The 3D camera 1054 may be configured to photograph a 3D contour of the target object, to obtain a 3D image of the target object. The 3D camera 1054 may include a transmitter and a receiver, and the transmitter may be located near the receiver. The transmitter may emit infrared light, and the receiver may be a 3D camera lens that can detect (or capture or receive) the infrared light.

Distances from different locations of the target object to the receiver may be different, and times of flight of light from different locations of the target object to the receiver may be different. Therefore, in some embodiments, 3D contour information of the target object may be obtained by measuring a direct time of flight (direct time of flight, DTOF) of light from the target object to the receiver. The 3D contour information is depth information, and the 3D image is a depth image.

In some embodiments, the transmitter and the receiver are jointly used to measure a direct time of flight of light between the electronic device 100 and the target object. As shown in FIG. 2, light (shown by a solid line in the figure) emitted by the transmitter is emitted to the target object, and is reflected to form reflected light (shown by a dashed line in the figure). A part of the reflected light enters the receiver. A distance between the transmitter and the receiver is a first distance, a distance between the transmitter and the target object is a second distance, and a distance between the target object and the receiver is a third distance. The first distance may be far less than the second distance and the third distance, that is, the first distance may be ignored relative to the second distance and the third distance. That is, the second distance is approximately equal to the third distance. Therefore, the direct time of flight of the light from the target object to the receiver may be approximately determined by measuring a direct time of flight of light emitted from the transmitter to the receiver, to obtain the 3D image including the 3D contour information of the target object.

Figure 3:
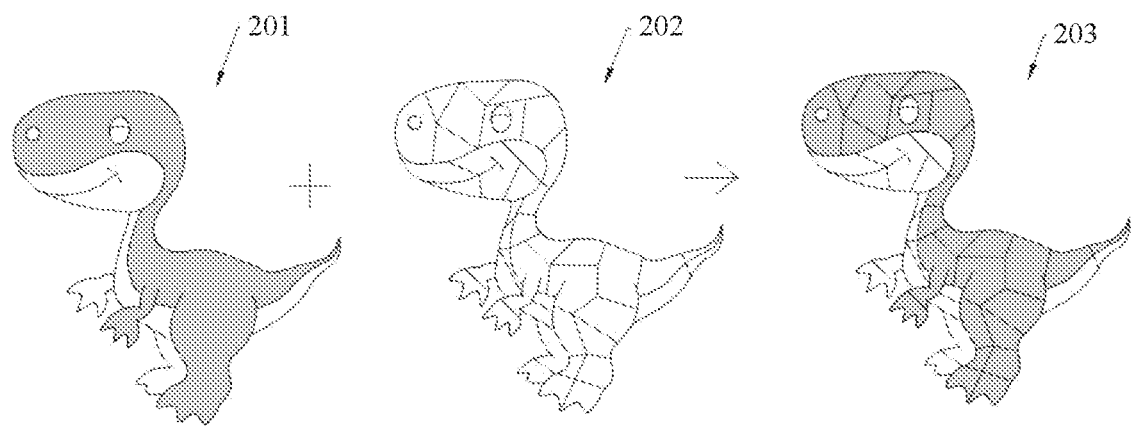
FIG. 3 is a schematic diagram of synthesizing a 2D image and a 3D image by the electronic device shown in FIG. 1.

Refer to FIG. 2 and FIG. 3. FIG. 3 is a schematic diagram of synthesizing a 2D image and a 3D image by the electronic device 100 shown in FIG. 1.

For example, the electronic device 100 may obtain the 2D image (for example, an image 201 in FIG. 3) of the target object through the primary 2D camera 1051 and/or the secondary 2D camera 1052, obtain the 3D image (for example, an image 202 in FIG. 3) of the target object through the 3D camera 1054, and obtain, by synthesizing the foregoing 2D image (for example, the image 201 in FIG. 3) and the foregoing 3D image (for example, the image 202 in FIG. 3), a vivid 3D image (for example, an image 203 in FIG. 3) that includes both the 3D contour information and the 2D image information. It may be understood that the image 201, the image 202, and the image 203 shown in FIG. 3 are merely examples. Specific parameters (such as a resolution, a pixel size, and a three-dimensional model granularity) of the image may not be limited in this application.

It may be understood that the structure shown in this embodiment of this application does not constitute a specific limitation on the electronic device 100. In some other embodiments of this application, the electronic device 100 may include more or fewer components than those shown in the figure. For example, the electronic device 100 may include more or fewer cameras than those shown in the figure.

In some embodiments, the rear-facing camera module 105 may alternatively include only the 3D camera 1054, where the 3D camera 1054 may further have a capability of photographing the 2D image. In other words, the electronic device 100 may photograph, through the 3D camera 1054, the vivid 3D image that includes both the 2D image information and the 3D contour information.

In this application, the rear-facing camera module 105 may obtain both the 2D image of the target object and the 3D image of the target object. Therefore, the electronic device 100 may implement applications such as facial recognition, portrait unlocking, gesture recognition, object modeling, a 3D game, and a smart home, thereby helping improve use experience of a user.

An embodiment of this application provides a TOF apparatus. The 3D camera 1054 of the electronic device 100 may use the TOF apparatus. A processor 106 of the electronic device 100 is electrically connected to the TOF apparatus, and the processor 106 is configured to form the 3D image of the target object based on an output signal of the TOF apparatus. The TOF apparatus includes a transmitter and a receiver, and both the transmitter and the receiver are divided into a plurality of regions. The TOF apparatus can capture a plurality of local 3D images corresponding to different regions of the target object (which may also be referred to as a photographed object) in a manner in which the transmitter performs region-based turning-on and the receiver performs region-based detection, and then the electronic device 100 splices the plurality of local 3D images, to obtain the 3D image of the target object.

Because the transmitter uses a region-based turning-on manner, and the receiver uses a region-based detection manner, a peak current required when the TOF apparatus captures a single local 3D image is greatly reduced compared with a conventional solution (a manner in which the transmitter turns on an entire region and the receiver detects an entire region). Therefore, the TOF apparatus can implement detection at a longer distance under a peak current allowed by the electronic device 100, and a detection range of the TOF apparatus and the electronic device 100 is larger.

The following describes an example structure of the TOF apparatus according to this application with reference to the accompanying drawings.

Figure 4:
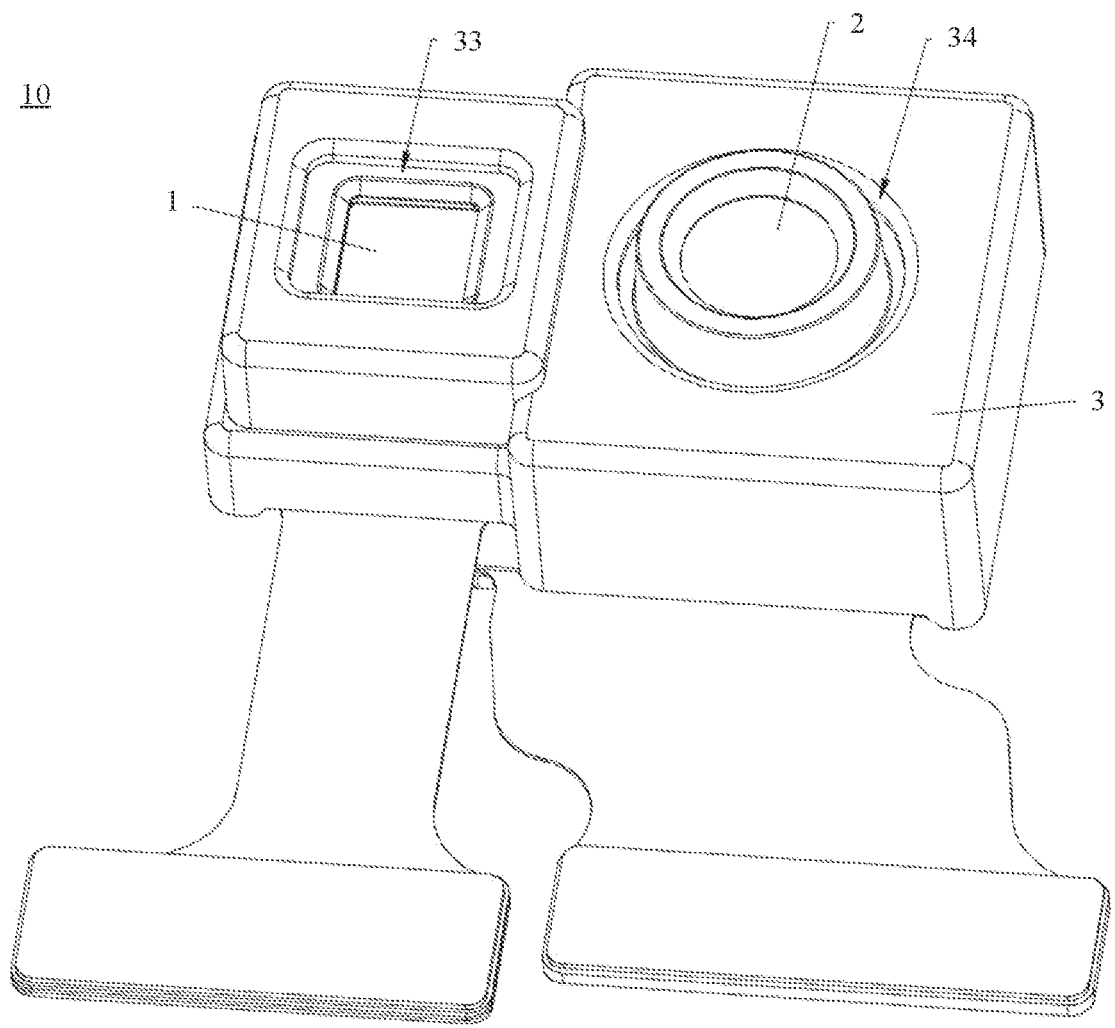
FIG. 4 is a schematic diagram of a structure of a TOF apparatus in some embodiments according to an embodiment of this application.
Figure 5:
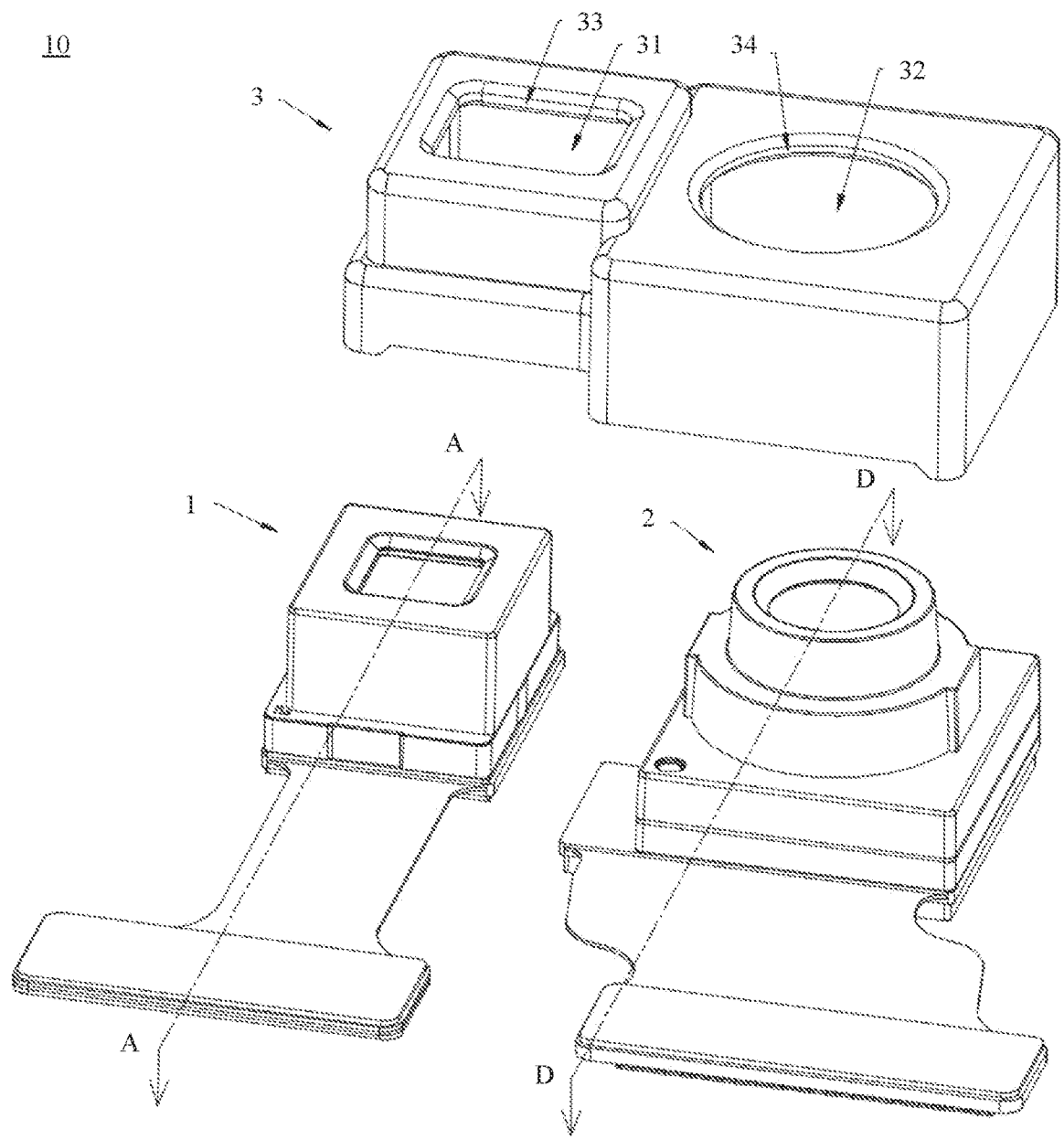
FIG. 5 is a schematic diagram of a partial exploded structure of the TOF apparatus shown in FIG. 4.

Refer to FIG. 4 and FIG. 5. FIG. 4 is a schematic diagram of a structure of a TOF apparatus 10 in some embodiments according to an embodiment of this application, and FIG. 5 is a schematic diagram of a partial exploded structure of the TOF apparatus 10 shown in FIG. 4.

In some embodiments, the TOF apparatus 10 includes a transmitter 1, a receiver 2, and an outer housing 3. The outer housing 3 has a first installation space 31, a second installation space 32, a first through hole 33, and a second through hole 34. The first through hole 33 is in communication with the first installation space 31, and the second through hole 34 is in communication with the second installation space 32. The transmitter 1 is installed in the first installation space 31 and is fixedly connected to the outer housing 3, and light emitted by the transmitter 1 can be emitted through the first through hole 33. The receiver 2 is installed in the second installation space 32 and is fixedly connected to the outer housing 3, and the receiver 2 can receive light through the second through hole 34. Both the transmitter 1 and the receiver 2 are fastened to the outer housing 3, so that the TOF apparatus 10 can form a modular structure, to facilitate installing the TOF apparatus 10 in the electronic device 100.

Figure 6:
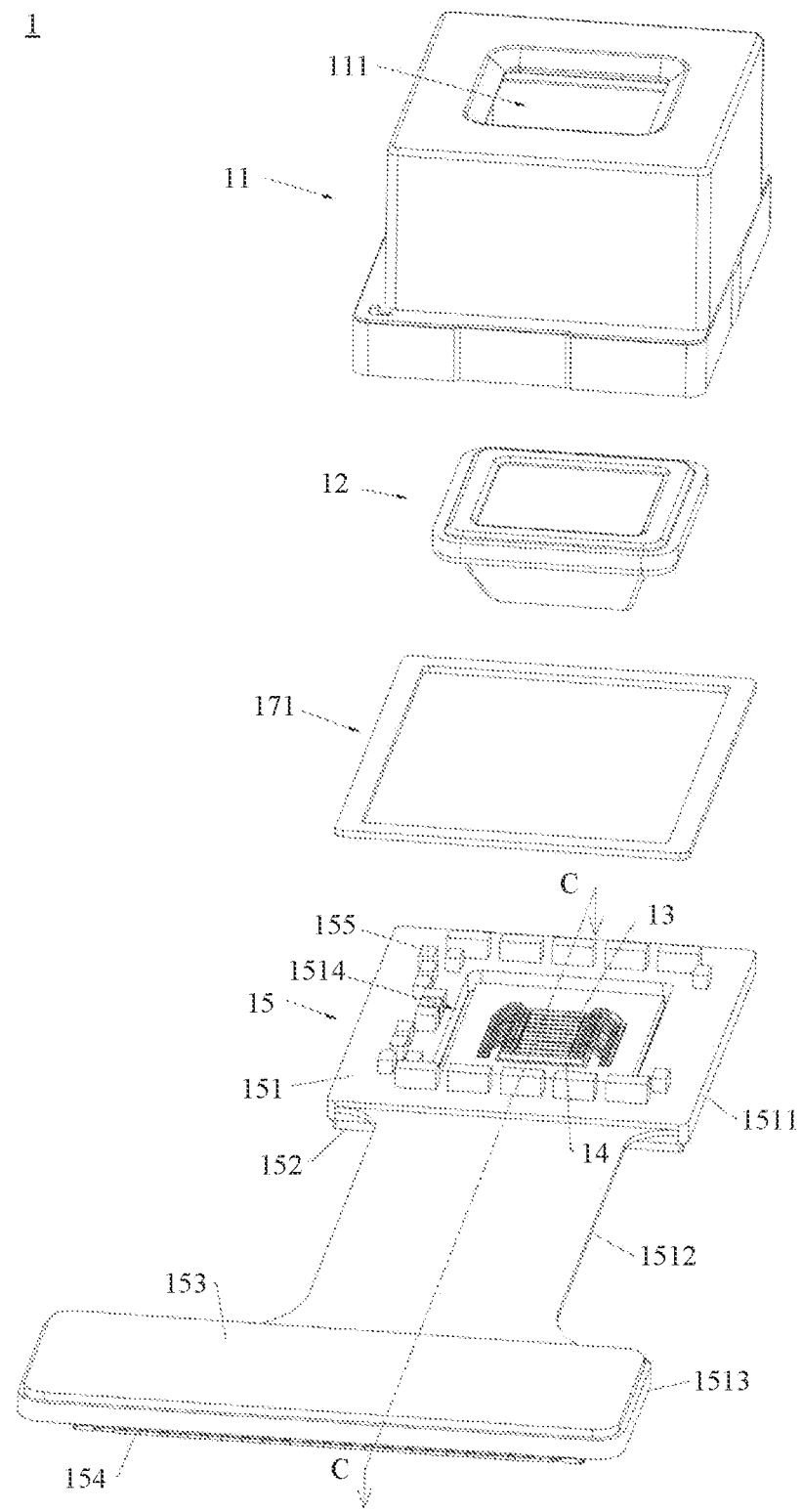
FIG. 6 is a schematic diagram of a partial exploded structure of a transmitter shown in FIG. 5.
Figure 7:
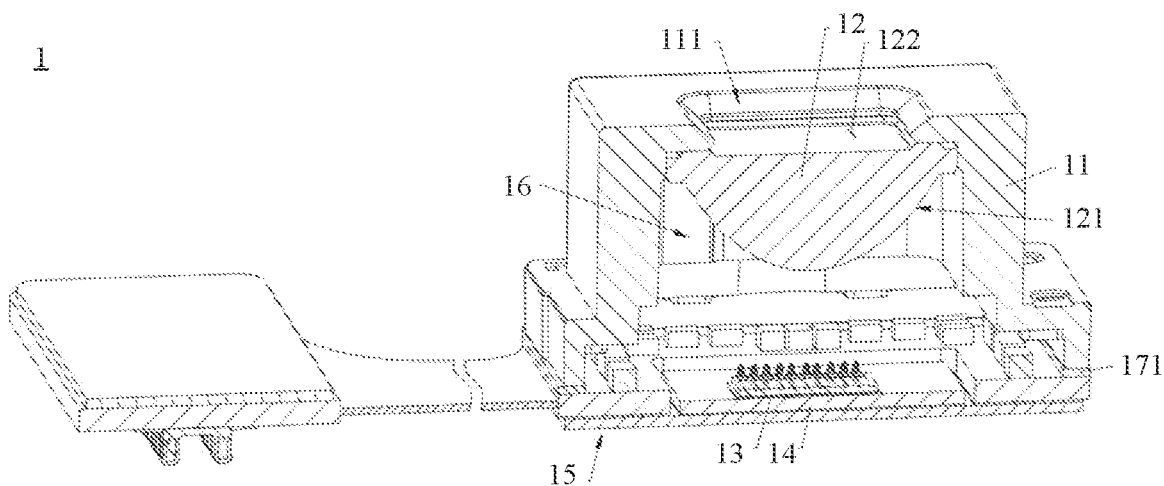
FIG. 7 is a schematic diagram of a cross sectional structure of the transmitter shown in FIG. 5 that is cut along A-A.

Refer to FIG. 6 and FIG. 7. FIG. 6 is a schematic diagram of a partial exploded structure of the transmitter 1 shown in FIG. 5, and FIG. 7 is a schematic diagram of a cross sectional structure of the transmitter 1 shown in FIG. 5 that is cut along A-A.

In some embodiments, the transmitter 1 includes a housing 11, an optical element 12, a light source 13, a drive chip 14, and a first circuit board assembly 15. The housing 11 is fastened on a top side of the first circuit board assembly 15, and the housing 11 and the first circuit board assembly 15 jointly enclose to form an inner cavity 16 of the transmitter. For example, the housing 11 is of a hollow structure, a top of the housing 11 has a light outlet hole 111, a bottom of the housing 11 is of an open structure, and the bottom of the housing 11 may be fixedly connected to the first circuit board assembly 15 through a bonding member 171. The optical element 12 is located in the inner cavity 16 of the transmitter and is fixedly connected to the housing 11, and the optical element 12 is disposed corresponding to the light outlet hole 111. For example, the optical element 12 may cover the light outlet hole 111, and a bonding member (not shown in the figure) may be disposed between the top of the optical element 12 and an inner wall of the housing 11. Both the drive chip 14 and the light source 13 are located in the inner cavity 16 of the transmitter, the drive chip 14 may be fastened to the first circuit board assembly 15, and the light source 13 may be fastened on a top side of the drive chip 14. The optical element 12 is located on a light emitting path of the light source 13. In this embodiment, after light emitted by the light source 13 passes through the optical element 12, the light is emitted from the transmitter 1 through the light outlet hole 111.

Figure 8:
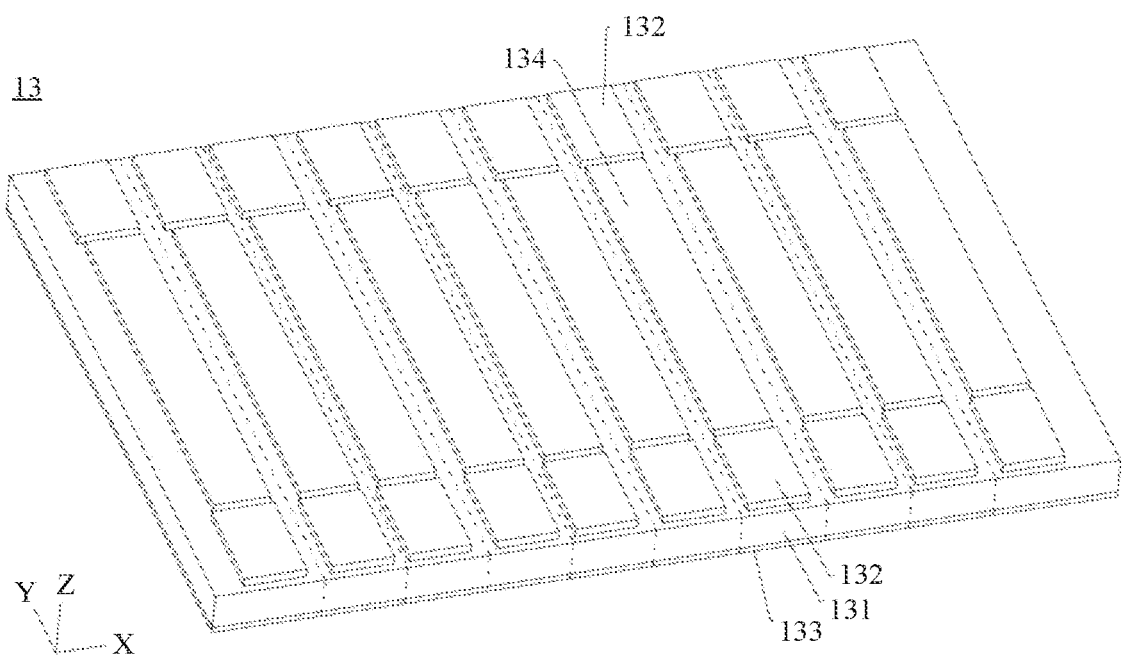
FIG. 8 is a schematic diagram of a structure of a light source shown in FIG. 6.

Refer to FIG. 8. FIG. 8 is a schematic diagram of a structure of the light source 13 shown in FIG. 6.

In some embodiments, the light source 13 includes a plurality of light emitting units 131, and each light emitting unit 131 may emit light, for example, may emit invisible light such as infrared light. The plurality of light emitting units 131 may work independently, and the plurality of light emitting units 131 may be turned on in turn according to a specific time sequence, to emit light in turn. For example, there may be 4 to 20 light emitting units 131.

For example, the plurality of light emitting units 131 of the light source 13 may be arranged in an N×1 manner, where N is an integer greater than or equal to 2. For example, the plurality of light emitting units 131 are arranged in a first direction X, each light emitting unit 131 extends in a second direction Y, and the second direction Y is perpendicular to the first direction X. A thickness direction of the light source 13 is a third direction Z, and the third direction Z is perpendicular to the first direction X and the second direction Y. Each light emitting unit 131 is approximately in a strip shape.

For example, the light source 13 may be, but is not limited to, a vertical-cavity surface-emitting laser (vertical-cavity surface-emitting laser, VCSEL). The light source 13 includes an anode pad 132 and a cathode pad 133, the anode pad 132 is located on a light emitting side of the light source 13, and the cathode pad 133 is located on a non-light emitting side of the light source 13. For example, there are a plurality of anode pads 132, each light emitting unit 131 includes two anode pads 132, and the two anode pads 132 are respectively located at two ends of the light emitting unit 131. Each light emitting unit 131 includes a light emitting region 134, and two anode pads 132 are respectively located on two sides of the light emitting region 134. For example, there is one cathode pad 133, and the plurality of light emitting units 131 share the one cathode pad 133. For example, a distance between light emitting regions 134 of two adjacent light emitting units 131 may be within a range of about 30 micrometers (μm) to 50 micrometers, for example, may be 40 micrometers.

Figure 9:
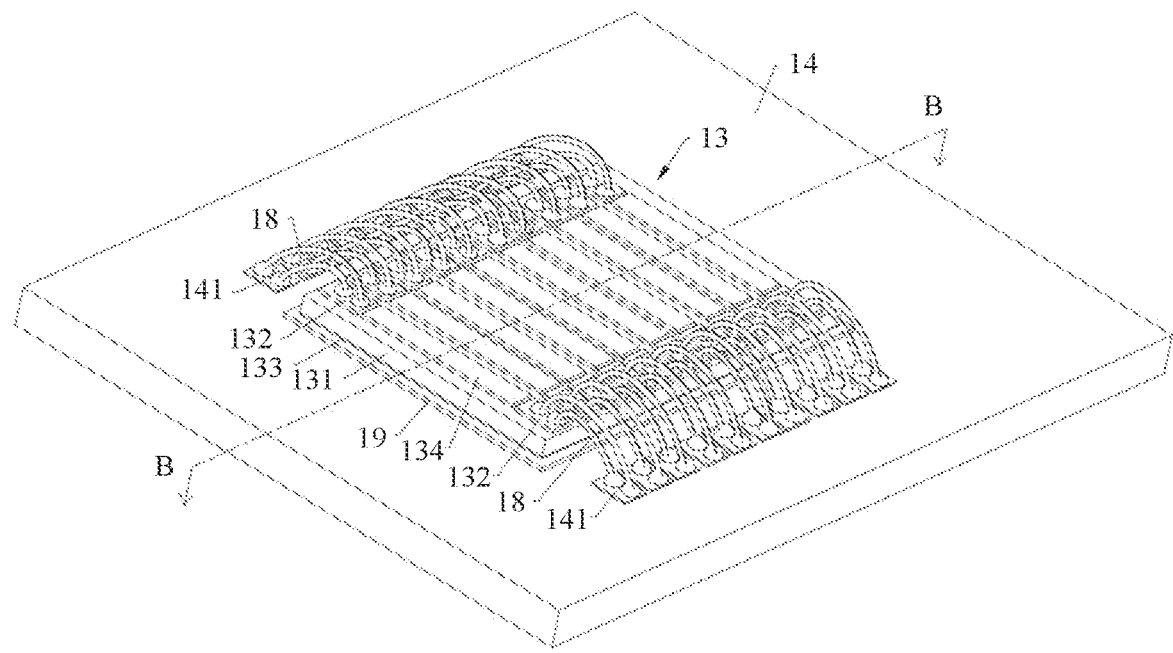
FIG. 9 is a schematic diagram of an assembly structure of the light source and a drive chip shown in FIG. 6.
Figure 10:
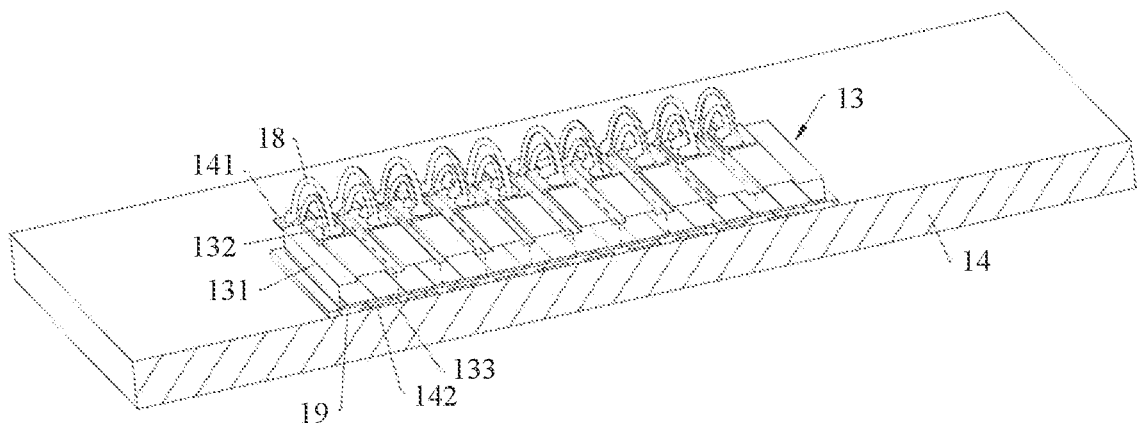
FIG. 10 is a schematic diagram of the structure shown in FIG. 9 that is cut along B-B.

Refer to FIG. 9 and FIG. 10. FIG. 9 is a schematic diagram of an assembly structure of the light source 13 and the drive chip 14 shown in FIG. 6, and FIG. 10 is a schematic diagram of the structure shown in FIG. 9 that is cut along B-B.

In some embodiments, the light source 13 and the drive chip 14 are disposed in a stacked manner, and the non-light emitting side of the light source 13 is fastened to the drive chip 14. The drive chip 14 is configured to turn on the plurality of light emitting units 131 in turn according to a specific time sequence. For example, the drive chip 14 includes a first pad 141 and a second pad 142. The first pad 141 is located on a side of the drive chip 14 close to the light source 13, and is located around the light source 13. The first pad 141 is connected to the anode pad 132 through a conductive wire 18. The conductive wire 18 may be a gold wire. The second pad 142 is located on the side of the drive chip 14 close to the light source 13 and is disposed facing the non-light emitting side of the light source 13, and the second pad 142 is connected to the cathode pad 133 through a conductive adhesive 19. The conductive adhesive 19 may implement an electrical connection function, or may implement a bonding and fastening function. The conductive adhesive 19 may be a conductive silver adhesive. In this case, the light source 13 can be electrically connected to the drive chip 14 through the connection between the anode pad 132 and the first pad 141 and the connection between the cathode pad 133 and the second pad 142, so that the drive chip 14 can turn on the light source 13 to control the light source 13 to emit light.

In this embodiment, the light source 13 and the drive chip 14 are disposed in a stacked manner, and are arranged in a compact manner, which facilitates a miniaturization design of the transmitter 1 and the TOF apparatus 10. In addition, the light source 13 and the drive chip 14 are disposed in the stacked manner, so that a wiring distance between the light source 13 and the drive chip 14 may also be greatly reduced (for example, a length of the conductive wire 18 is obviously shortened), thereby effectively improving a light waveform of the light source 13 and ensuring performance of the transmitter 1.

For example, when the TOF apparatus 10 uses a direct time of flight technology, the transmitter 1 uses a nanosecond (ns)-level pulse width to drive light emission. A pulse width of a light waveform, a rising waveform of a light waveform, and a falling waveform of a light waveform of light emitted by the transmitter 1 have obvious impact on ranging precision of the TOF apparatus 10, and a factor that affects the light waveform is a wiring inductor between the drive chip 14 and the light source 13. If there is a long loop between the light source 13 and the drive chip 14, a high wiring inductor is introduced. As a result, a rising speed of the light waveform slows down, a rising time increases, and the ranging precision of the TOF apparatus 10 decreases. However, in this embodiment, because a wiring distance between the light source 13 and the drive chip 14 is very short, a light waveform of the light source 13 can be effectively improved, and the ranging precision of the TOF apparatus 10 can be improved.

For example, as shown in FIG. 9 and FIG. 10, there are a plurality of first pads 141, the plurality of first pads 141 are in groups of two, each group of first pads 141 correspond to one light emitting unit 131, and two first pads 141 in a same group are respectively located on two sides of a corresponding light emitting unit 131 and are respectively connected to two anode pads 132 of the corresponding light emitting unit 131.

In this embodiment, the anode pad 132 of the light emitting unit 131 of the light source 13 is connected to the first pad 141 of the drive chip 14 by binding conductive wires 18 on both sides, so that the drive chip 14 can simultaneously turn on or nearly simultaneously turn on an entire light emitting region 134 of the light emitting unit 131, to reduce a detection error caused by uneven turning-on time of the plurality of light emitting units 131 of the transmitter 1, and improve the ranging precision and photographing quality of the TOF apparatus 10.

For example, as shown in FIG. 9, conduction may be implemented between the corresponding anode pad 132 and the first pad 141 through two conductive wires 18, to improve reliability of the connection between the anode pad 132 and the first pad 141.

In some other embodiments, each light emitting unit 131 may alternatively include one anode pad 132. The anode pad 132 is connected to one first pad 141 of the drive chip 14 through the conductive wire 18, to implement an electrical connection between the drive chip 14 and the light source 13. In some other embodiments, there may alternatively be a plurality of cathode pads 133 of the light source 13. Each light emitting unit 131 includes at least one cathode pad 133. The cathode pad 133 is connected to the second pad 142 of the drive chip 14, to implement the electrical connection between the drive chip 14 and the light source 13.

It may be understood that, as described above, the drive chip 14 may be configured to supply power to the light source 13, to drive light emission by using a nanosecond-level pulse width. In some embodiments, the drive chip 14 may be further configured to implement functions such as laser safety monitoring and power supply voltage monitoring. In some embodiments, the drive chip 14 may be further configured to implement optical power control, pulse width adjustment, and the like for the light source 13. A function of the drive chip 14 is not strictly limited in this embodiment of this application.

Figure 11:
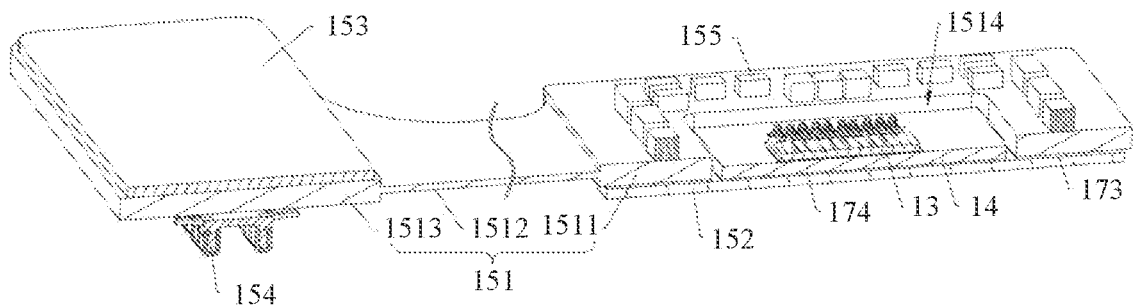
FIG. 11 is a schematic diagram of a cross section of a first circuit board assembly, a drive chip, and the light source shown in FIG. 6 that are cut along C-C.

Refer to FIG. 6 and FIG. 11. FIG. 11 is a schematic diagram of a cross section of the first circuit board assembly 15, the drive chip 14, and the light source 13 shown in FIG. 6 that are cut along C-C.

In some embodiments, the first circuit board assembly 15 includes a first circuit board 151, a first reinforcement plate 152, a second reinforcement plate 153, a first electrical connector 154, and a plurality of first components 155. For example, the first circuit board 151 may be a flexible-rigid circuit board. The first circuit board 151 may include a first rigid board part 1511, a first flexible board part 1512, and a second rigid board part 1513 that are sequentially connected. Rigidity of the first rigid board part 1511 and rigidity of the second rigid board part 1513 are greater than rigidity of the first flexible board part 1512.

For example, the first rigid board part 1511 of the first circuit board 151 has a through hole 1514, and the through hole 1514 penetrates the first rigid board part 1511 in a thickness direction of the first rigid board part 1511. The first reinforcement plate 152 is fastened on a side of the first rigid board part 1511 of the first circuit board 151 and covers the through hole 1514. The first reinforcement plate 152 may be fixedly connected to the first rigid board part 1511 through a bonding member 173. The drive chip 14 is at least partially located in the through hole 1514, and a side of the drive chip 14 away from the light source 13 is fastened on the first reinforcement plate 152. For example, the drive chip 14 may be entirely located in the through hole 1514, and the light source 13 may be entirely or partially located in the through hole 1514. The drive chip 14 may be fixedly connected to the first reinforcement plate 152 through a bonding member 174.

In this embodiment, an arrangement manner of the drive chip 14, the light source 13, and the first circuit board 151 assembly 15 helps reduce a thickness of the transmitter 1 and implement miniaturization of the TOF apparatus 10.

For example, the plurality of first components 155 are fastened on a side of the first rigid board part 1511 opposite to the first reinforcement plate 152, and the plurality of first components 155 may be arranged around the through hole 1514. The plurality of first components 155 may include a matching component of the drive chip 14. The plurality of first components 155 may include one or more of a capacitor, an inductor, and a resistor.

For example, the first electrical connector 154 is fastened on a side of the second rigid board part 1513, and the first electrical connector 154 is configured to be electrically connected to an external component of the TOF apparatus 10. The first electrical connector 154 may be an electrical connector of a type such as a board-to-board connector. This is not strictly limited in this embodiment of this application.

The second reinforcement plate 153 is fastened on another side of the second rigid board part 1513, and is configured to increase structural strength of the first circuit board 151 assembly 15. For example, the first reinforcement plate 152 and/or the second reinforcement plate 153 may be a metal plate such as a steel plate, or may be a plastic plate with high rigidity.

In some other embodiments, the first rigid board part 1511 may not be provided with the through hole 1514, and the drive chip 14 is fastened on a top side of the first rigid board part 1511. In this case, if the structural strength of the first rigid board part 1511 is sufficient, the first reinforcement plate 152 may not be disposed on the first circuit board 151 assembly 15. In some other embodiments, if the structural strength of the second rigid board part 1513 is sufficient, the second reinforcement plate 153 may either not be disposed on the first circuit board 151 assembly 15.

In some other embodiments, the first circuit board 151 may alternatively be a flexible circuit board. The flexible circuit board includes a first part, a second part, and a third part that are sequentially connected. For a connection relationship and a location relationship between the first part and another structure, refer to the first rigid board part 1511 in the foregoing embodiment. For a connection relationship and a location relationship between the third part and another structure, refer to the second rigid board part 1513 in the foregoing embodiment. Details are not described herein again.

Figure 12:
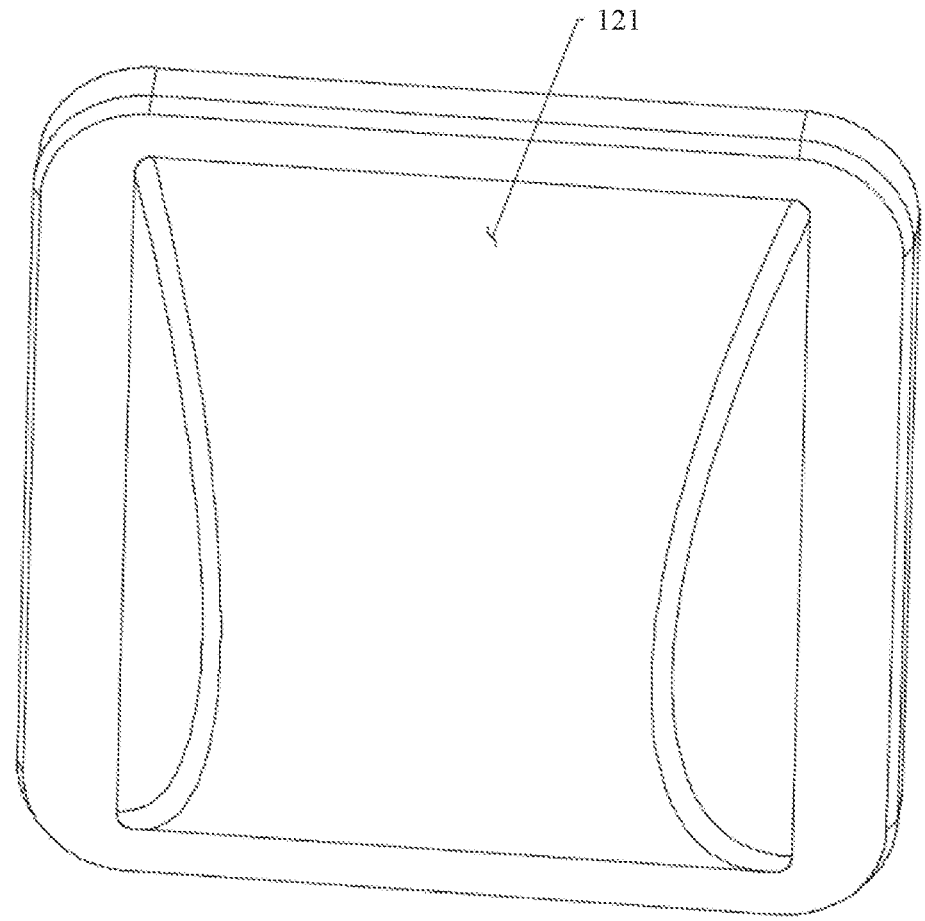
FIG. 12 is a schematic diagram of a structure of an optical element shown in FIG. 6 from another angle.

Refer to FIG. 7 and FIG. 12. FIG. 12 is a schematic diagram of a structure of the optical element 12 shown in FIG. 6 from another angle.

In some embodiments, the optical element 12 may include a light inlet surface 121 and a light outlet surface 122, and the light outlet surface 122 is disposed opposite to the light inlet surface 121. The light inlet surface 121 may be a curved surface, and a middle part of the light inlet surface 121 protrudes in a direction away from the light outlet surface 122. An optical signal emitted by the light source 13 enters the optical element 12 through the light inlet surface 121, and is emitted from the optical element 12 through the light outlet surface 122. The transmitter 1 implements emitting the optical signal. The optical element 12 is configured to change a propagation direction of the optical signal.

Figure 13:
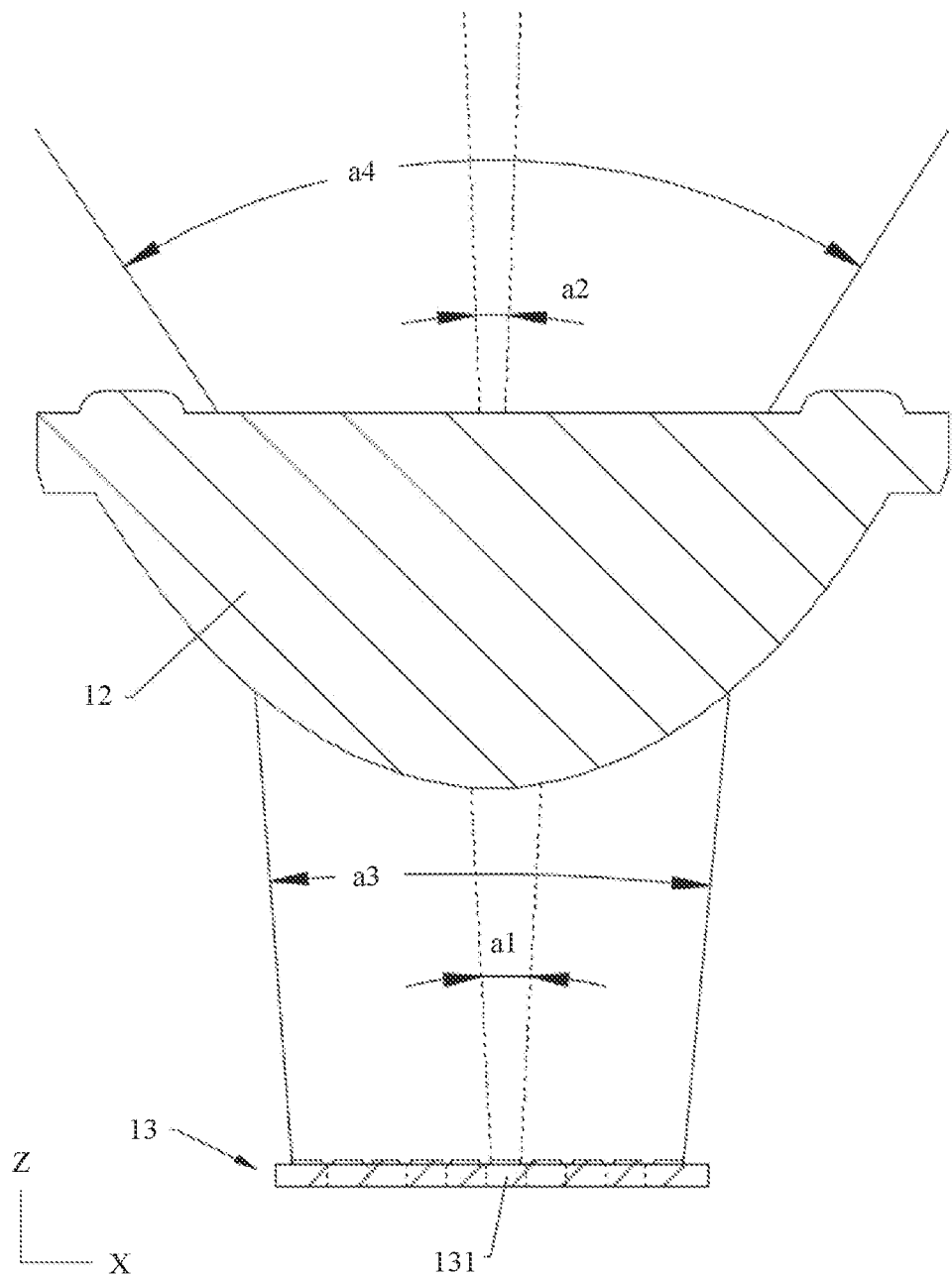
FIG. 13 is a schematic diagram of a light source and an optical element in FIG. 7.
Figure 14:
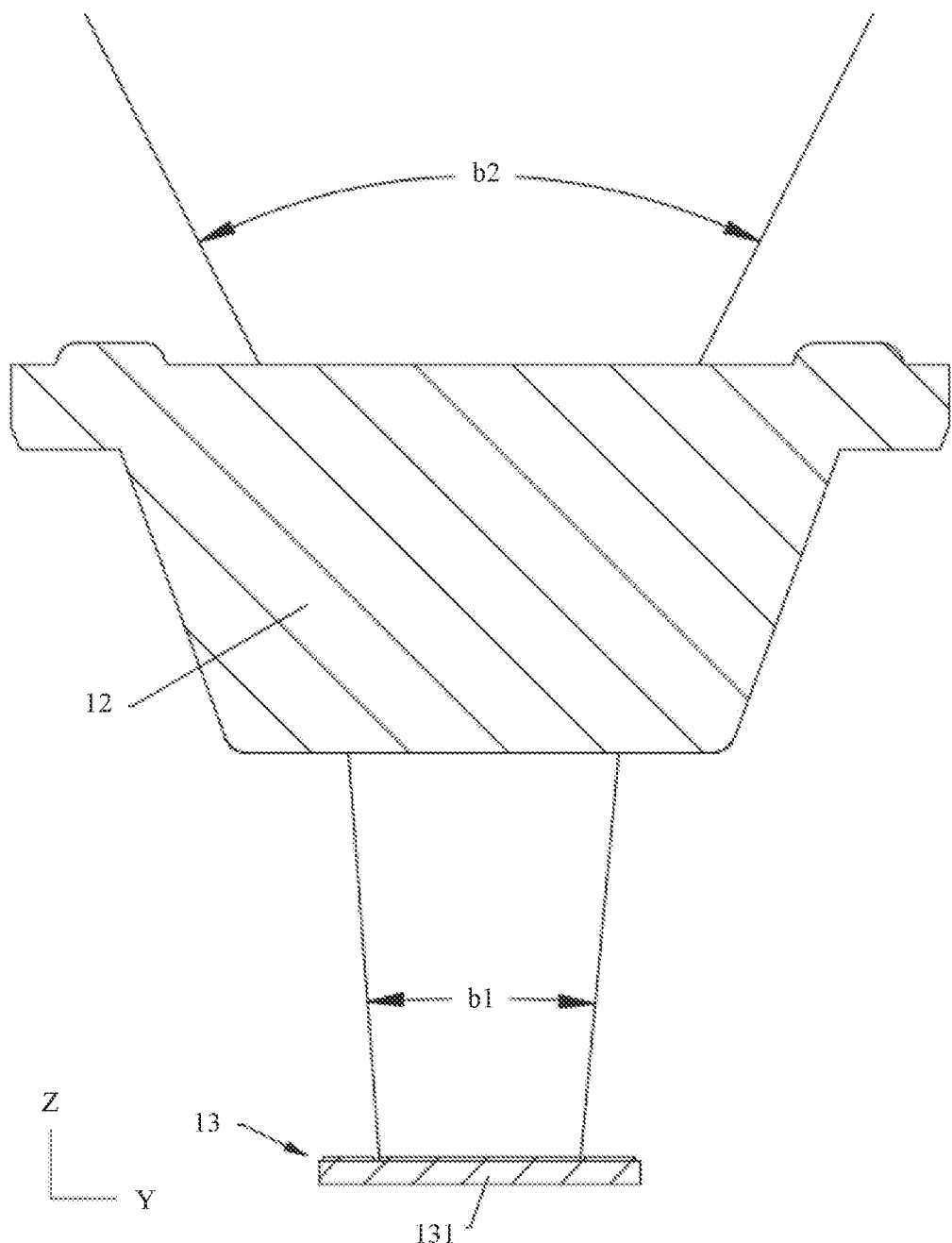
FIG. 14 is a schematic diagram of the light source and the optical element shown in FIG. 13 from another angle.

Refer to FIG. 13 and FIG. 14. FIG. 13 is a schematic diagram of the light source 13 and the optical element 12 in FIG. 7, and FIG. 14 is a schematic diagram of the light source 13 and the optical element 12 shown in FIG. 13 from another angle. A cross section shown in FIG. 13 is parallel to the first direction X, and a cross section shown in FIG. 14 is parallel to the second direction Y.

In some embodiments, the optical element 12 is located on light emitting paths of the plurality of light emitting units 131 of the light source 13, and the optical element 12 is configured to enable light emitted by the plurality of light emitting units 131 to form a plurality of projection fields of view in a one-to-one correspondence. The plurality of projection fields of view are arranged in the first direction X. The plurality of projection fields of view jointly form a total projection field of view of the transmitter 1. FIG. 13 simply shows, in the first direction X, a projection field of view formed after an emission field of view of a single light emitting unit 131 passes through the optical element 12, and the total projection field of view of the transmitter 1 formed after an emission field of view of the light source 13 passes through the optical element 12. FIG. 14 simply shows, in the second direction Y, a projection field of view formed after the emission field of view of the single light emitting unit 131 passes through the optical element 12, where the emission field of view of the light source 13 is the same as the emission field of view of the single light emitting unit 131, and the total projection field of view of the transmitter 1 is the same as the projection field of view of the single light emitting unit 131.

In some embodiments, as shown in FIG. 13 and FIG. 14, after passing through the optical element 12, the angle of view of the single light emitting unit 131 shrinks in the first direction X and expands in the second direction Y. That is, in the first direction X, an angle of view $a2$ of the projection field of view of the light emitting unit 131 is less than an angle of view $a1$ of the emission field of view of the light emitting unit 131; and in the second direction Y, an angle of view $b2$ of the projection field of view of the light emitting unit 131 is greater than an angle of view $b1$ of the emission field of view of the light emitting unit 131. For example, in the first direction X, the angle of view $a1$ of the emission field of view of the light emitting unit 131 may be approximately within a range of 20° to 25°, and the angle of view $a2$ of the projection field of view of the light emitting unit 131 may be approximately within a range of 4° to 5°. In the second direction Y, the angle of view $b1$ of the emission field of view of the light emitting unit 131 may be approximately within a range of 20° to 25°, and the angle of view $b2$ of the projection field of view of the light emitting unit 131 may be approximately within a range of 50° to 60°.

After passing through the optical element 12, the angle of view of the light source 13 expands in both the first direction X and the second direction Y. In other words, in the first direction X and the second direction Y, an angle of view ($a4$, $b2$) of the total projection field of view of the transmitter 1 is greater than the angle of view of the emission field of view of the light source 13. An angle of view of the light source 13 in the first direction X and the second direction Y is equal to an angle of view ($a3$, $b1$) of the single light emitting unit 131. For example, angles of view $a4$ of the plurality of projection fields of view (that is, the total projection field of view of the transmitter 1) in the first direction X may be within a range of 65° to 70°, and angles of view $b2$ of the plurality of projection fields of view in the second direction Y may be within a range of 50° to 60°. In some embodiments, the angle of view of the total projection field of view of the transmitter 1 may be 78°.

A structure of the optical element 12 may be implemented in a plurality of manners. For example, the optical element 12 may be formed by assembling a plurality of transparent structures, or may be an integrally formed structure. In this embodiment of this application, a specific implementation structure of the optical element 12 is not strictly limited. However, it is expected that the optical element 12 can enable the plurality of projection fields of view to satisfy the following conditions as much as possible: for example, having a same spatial location, better uniformity, and better window efficiency. For example, it is expected that energy of a beam emitted by the transmitter 1 can be distributed in a valid region (that is, an expected total projection field of view of the transmitter 1) as much as possible, so that the window efficiency can be greater than or greater than 60%, to improve energy utilization.

Figure 15:
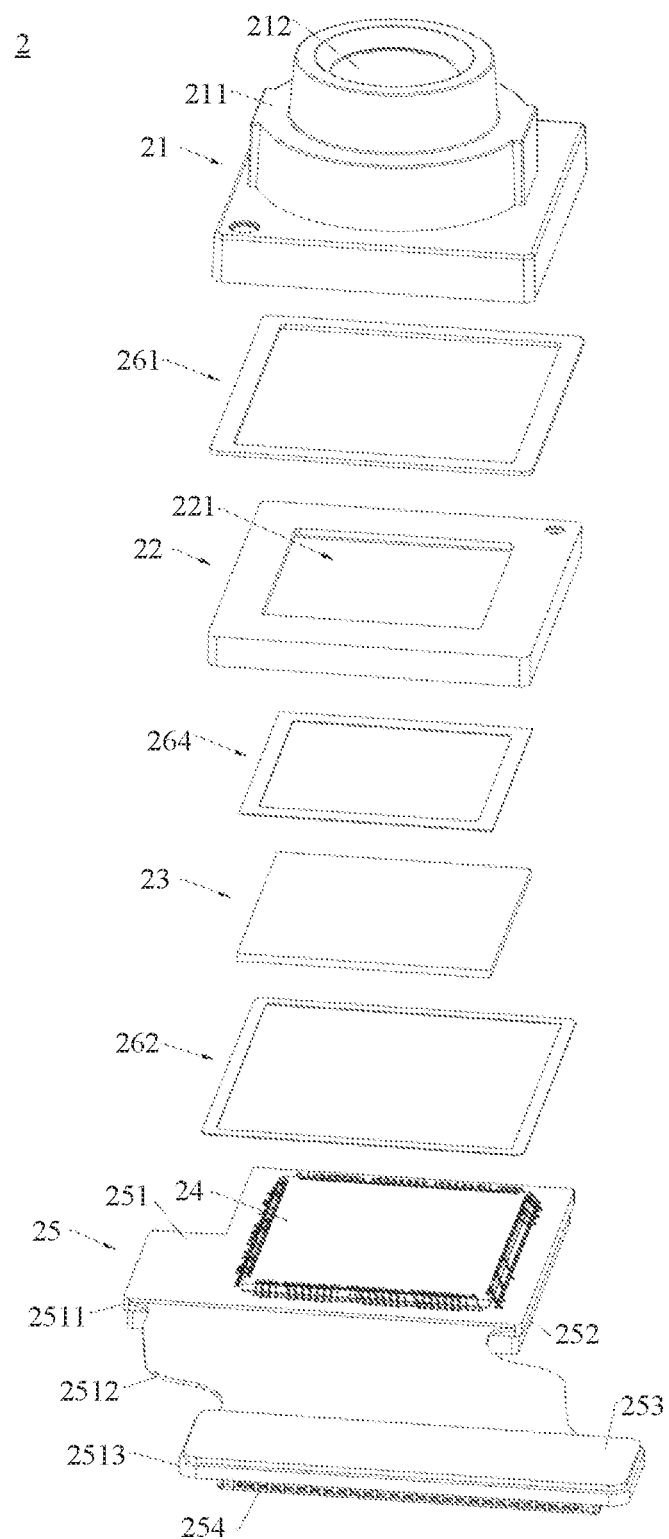
FIG. 15 is a schematic diagram of a partial exploded structure of a receiver shown in FIG. 5.
Figure 16:
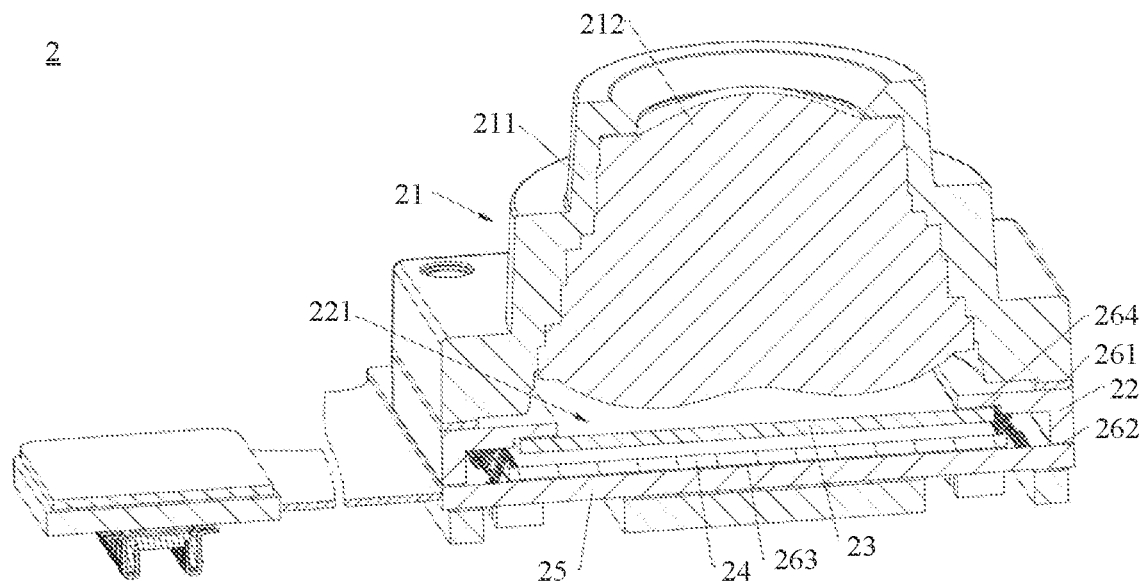
FIG. 16 is a schematic diagram of a cross sectional structure of the receiver shown in FIG. 5 that is cut along D-D.

Refer to FIG. 15 and FIG. 16. FIG. 15 is a schematic diagram of a partial exploded structure of the receiver 2 shown in FIG. 5, and FIG. 16 is a schematic diagram of a cross sectional structure of the receiver 2 shown in FIG. 5 that is cut along D-D.

In some embodiments, the receiver 2 includes a camera lens 21, a base 22, a light filter 23, an image sensor 24, and a second circuit board assembly 25.

For example, the camera lens 21 may be fastened on a side of the base 22 through a bonding member 261. The camera lens 21 may be a fixed-focal-length camera lens (which may also be referred to as a fixed-focus camera lens) or a zoom camera lens. FIG. 15 and FIG. 16 are schematic diagrams using an example in which the camera lens 21 is a fixed-focal-length camera lens. The camera lens 21 may alternatively be a short-focus camera lens, a medium long-focus camera lens, a long-focus camera lens, or the like.

The camera lens 21 may include a lens tube 211 and one or more lenses (lens) 212 disposed in the lens tube 211. The lens tube 211 is of a hollow structure and has openings at two ends. The openings at the two ends are respectively a light inlet and a light outlet. The light outlet is disposed close to the base 22. An optical signal outside the receiver 2 can be emitted into the camera lens 21 from the light inlet. After passing through the one or more lenses 212, the optical signal is emitted out of the camera lens 21 from the light outlet. In other words, the base 22 is located on a light emitting side of the camera lens 21. The one or more lenses 212 can change a propagation direction of light, so that the camera lens 21 can converge the light and emit the light to a predetermined region. The one or more lenses 212 may include a plastic (plastic) lens and/or a glass (glass) lens. The one or more lenses 212 may include a spherical lens and/or an aspheric lens.

It should be understood that the lens tube 211 shown in FIG. 15 and FIG. 16 is merely an example. A structure, a size, and the like of the lens tube 211 may not be limited in this embodiment of this application. The lens 212 shown in FIG. 16 is merely an example. A quantity of lenses 212, a structure of the lens 212, and the like may not be limited in this embodiment of this application.

It may be understood that in some other embodiments, the camera lens 21 may alternatively be a zoom camera lens. In this case, the camera lens 21 may further include a motor, and the motor is configured to drive the camera lens 21 to move in an optical axis direction, to implement automatic focusing.

For example, the second circuit board assembly 25 may be fastened on another side of the base 22 through a bonding member 262. The base 22 and the second circuit board assembly 25 jointly enclose to form an accommodating space. A through hole 221 is disposed in a middle part of the base 22, and the through hole 221 is in communication with the accommodating space.

For example, the image sensor 24 is located on the light emitting side of the camera lens 21. The image sensor 24 may be located in the accommodating space and fastened to the second circuit board assembly 25. For example, the image sensor 24 may be bonded to the second circuit board assembly 25 through a bonding layer 263, or the image sensor 24 may be fastened to the second circuit board assembly 25 by welding. A light sensing side of the image sensor 24 is disposed facing the camera lens 21.

The image sensor 24 may be a semiconductor chip. Hundreds of thousands to millions of photodiodes are disposed on a light sensing surface of the image sensor 24, and the photodiode may be, for example, a single photon avalanche diode (single photon avalanche diode, SPAD). The photodiode generates charges when exposed to light, thereby converting an optical signal into an electrical signal. The image sensor 24 may be a charge coupled device (charge coupled device, CCD), a complementary metal-oxide semiconductor (complementary metal-oxide semiconductor, CMOS), or the like.

For example, the light filter 23 is located on the light emitting side of the camera lens 21 and is fastened to the base 22, where the light filter 23 may be accommodated in the accommodating space. In some other embodiments, the light filter 23 may alternatively be located on a side of the base 22 facing the camera lens 21, where the light filter 23 may cover the through hole 221 of the base 22. A peripheral edge of the light filter 23 may be fixedly connected to the base 22 through a bonding member 264. The light filter 23 may eliminate unnecessary light (for example, visible light) projected onto the image sensor 24, and prevent the image sensor 24 from generating an image defect such as a ripple, to improve an effective resolution and image reproduction of the image sensor 24.

A working principle of the receiver 2 may be as follows: Reflected light formed by reflection by a target object may pass through the one or more lenses 212 in the lens tube 211, then pass through the light filter 23, and be projected to the light sensing surface of the image sensor 24. The image sensor 24 may convert the optical signal into the electrical signal, to obtain 3D contour information of the target object, and then transmit the 3D contour information to a component such as the processor 106 of the electronic device 100 by using the second circuit board assembly 25, to perform subsequent image processing.

Figure 17:
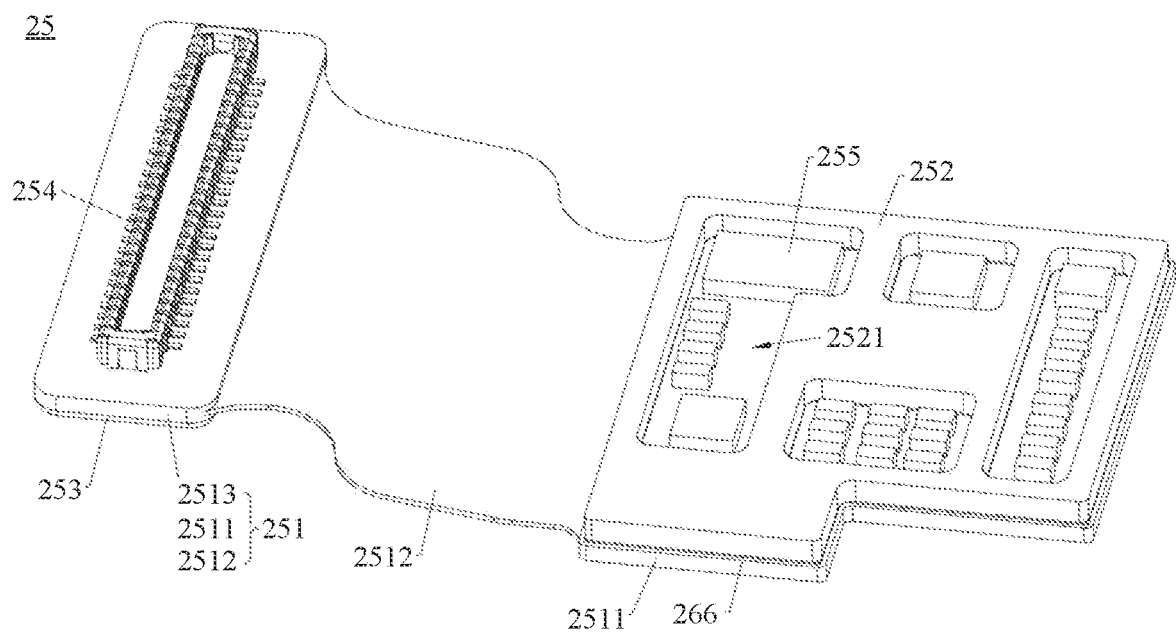
FIG. 17 is a schematic diagram of a structure of a second circuit board assembly shown in FIG. 15 from another angle.

Refer to FIG. 15 and FIG. 17. FIG. 17 is a schematic diagram of a structure of the second circuit board assembly 25 shown in FIG. 15 from another angle.

In some embodiments, the second circuit board assembly 25 includes a second circuit board 251, a third reinforcement plate 252, a fourth reinforcement plate 253, a second electrical connector 254, and a plurality of second components 255. A non-light sensing side of the image sensor 24 may be fastened on the second circuit board 251. The third reinforcement plate 252 is fastened on a side of the second circuit board 251 away from the image sensor 24, and the third reinforcement plate 252 is provided with one or more vias 2521. The plurality of second components 255 are located in the one or more vias 2521 and are fastened on the second circuit board 251.

In this embodiment, the second circuit board assembly 25 uses a component back-mounted design, which helps reduce space occupied by the second circuit board assembly 25 in a direction parallel to a board surface, so that the receiver 2 and the TOF apparatus 10 are more easily miniaturized. The third reinforcement plate 252 may further protect the plurality of second components 255, prevent collision, and increase structural strength of the circuit board.

Projections of the plurality of second components 255 on the second circuit board 251 may at least partially overlap a projection of the image sensor 24 on the second circuit board 251, to further improve space utilization of the second circuit board assembly 25, and facilitate miniaturization of the receiver 2 and the TOF apparatus 10. It may be understood that at least partial overlapping may include two cases: entire overlapping and partial overlapping. The entire overlapping means that a projection of one entirely covers a projection of the other.

For example, the second circuit board 251 may be a flexible-rigid circuit board. The second circuit board 251 may include a third rigid board part 2511, a second flexible board part 2512, and a fourth rigid board part 2513 that are sequentially connected. Rigidity of the third rigid board part 2511 and rigidity of the fourth rigid board part 2513 are greater than rigidity of the second flexible board part 2512. The non-light sensing side of the image sensor 24 may be fastened on a side of the third rigid board part 2511, the third reinforcement plate 252 may be fastened on another side of the third rigid board part 2511 through a bonding member 266, and the plurality of second components 255 may be fastened on the third rigid board part 2511 in a manner such as welding. The plurality of second components 255 may include a matching component of the image sensor 24. The plurality of second components 255 may include one or more of a capacitor, an inductor, and a resistor.

For example, the second electrical connector 254 is fastened on a side of the fourth rigid board part 2513, and the second electrical connector 254 is configured to be electrically connected to an external component of the TOF apparatus 10. The second electrical connector 254 may be an electrical connector of a type such as a board-to-board connector. This is not strictly limited in this embodiment of this application. The fourth reinforcement plate 253 is fastened on another side of the fourth rigid board part 2513, and is configured to increase structural strength of the second circuit board assembly 25. For example, the third reinforcement plate 252 and/or the fourth reinforcement plate 253 may be a metal plate such as a steel plate, or may be a plastic plate with high rigidity.

In some other embodiments, the second circuit board 251 may alternatively be a flexible circuit board. The flexible circuit board includes a first part, a second part, and a third part that are sequentially connected. For a connection relationship and a location relationship between the first part and another structure, refer to the third rigid board part 2511 in the foregoing embodiment. For a connection relationship and a location relationship between the third part and another structure, refer to the fourth rigid board part 2513 in the foregoing embodiment. Details are not described herein again.

Figure 18:
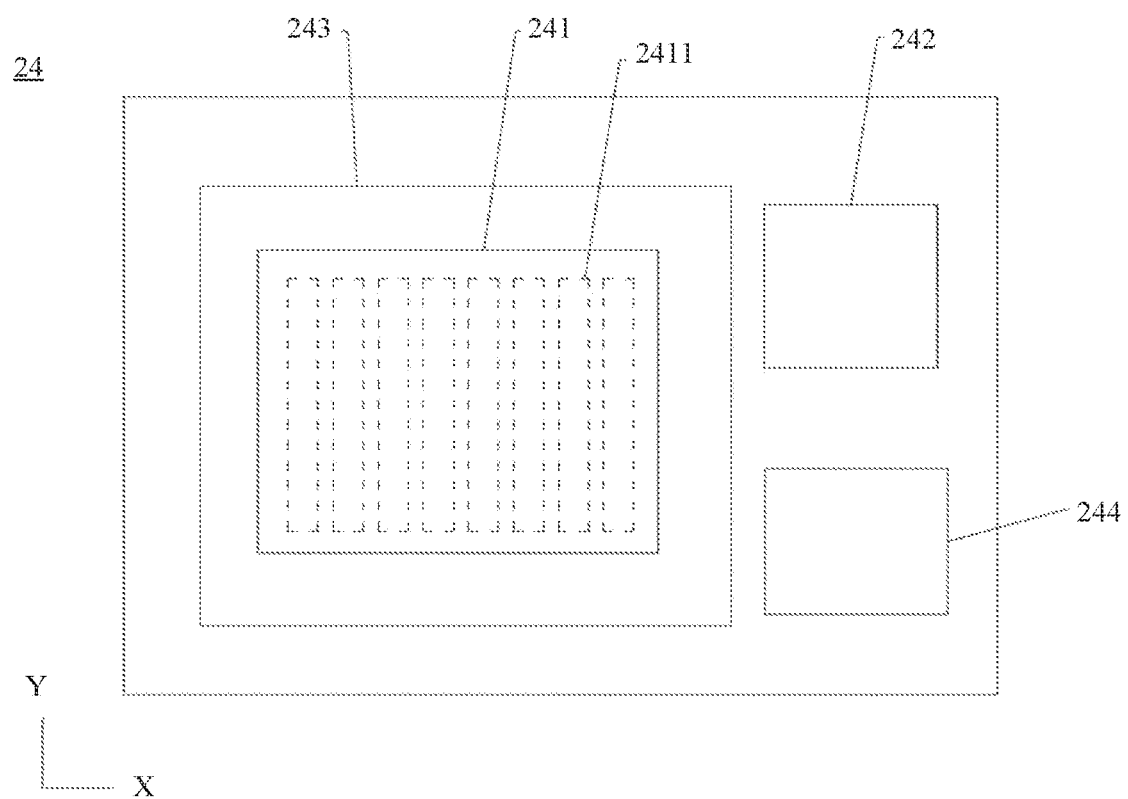
FIG. 18 is a schematic block diagram of an image sensor shown in FIG. 15.

Refer to FIG. 18. FIG. 18 is a schematic block diagram of the image sensor 24 shown in FIG. 15. FIG. 18 merely schematically shows a plurality of functional regions (or referred to as functional modules) of the image sensor 24, and does not limit an actual structure, an actual circuit, and the like of the image sensor 24.

In some embodiments, the image sensor 24 may include a light sensing circuit 241, a logic control circuit 242, a data storage and conversion circuit 243, and a power supply circuit 244. The light sensing circuit 241 includes a plurality of light sensing units 2411, and the plurality of light sensing units 2411 may work independently. A quantity of the light sensing units 2411 is the same as a quantity of the light emitting units 131 of the light source 13. Each light sensing unit 2411 may include a plurality of single-photon detectors (not shown in the figure). The logic control circuit 242 is configured to start the plurality of light sensing units 2411 in turn according to a specific time sequence. A started light sensing unit 2411 can convert an optical signal into an electrical signal. For example, the logic control circuit 242 may configure the power supply circuit 244, so that the power supply circuit 244 supplies power to the light sensing units 2411 in turn according to the specific time sequence.

In this embodiment, the image sensor 24 uses a region-based startup design. Compared with a conventional solution in which the image sensor is started as a whole, in this embodiment, a single-photon detector of another light sensing unit 2411 in a non-started state of the image sensor 24 can avoid a waste of power consumption caused by incorrect triggering due to ambient light, thereby reducing energy consumption of the receiver 2. In addition, the image sensor 24 uses the region-based startup design, which also helps avoid problems such as dark count and crosstalk.

The data storage and conversion circuit 243 is configured to calculate and buffer depth data. For example, the data storage and conversion circuit 243 includes a time-to-digital converter (time-to-digital converter, TDC) and a memory. The time-to-digital converter is electrically connected to the plurality of light sensing units 2411, and is configured to convert analog signals output by the plurality of light sensing units 2411 into digital signals represented by time. The memory is electrically connected to the time-to-digital converter, and is configured to store the digital signals. For example, the time-to-digital converter is configured to determine a time at which the light sensing unit 2411 receives the optical signal, and then accordingly calculate a time difference between a time at which the TOF apparatus 10 emits the optical signal and a time at which the TOF apparatus 10 receives the optical signal.

For example, the logic control circuit 242 and the power supply circuit 244 may be located around the light sensing circuit 241, and the data storage and conversion circuit 243 may be located on a non-light sensing side of the light sensing circuit 241, that is, located below the light sensing circuit 241, and is stacked with the light sensing circuit 241. For example, a single light sensing unit 2411 may include P×Q single-photon detectors, and the time-to-digital converter may include P×Q units, where both P and Q are positive integers. In this case, a quantity of units of the time-to-digital converter corresponds to a quantity of single-photon detectors of the light sensing unit 2411, so that an area of the image sensor 24 can be reduced when a requirement for calculating and buffering the depth data is satisfied, thereby facilitating miniaturization of the receiver 2 and the TOF apparatus 10.

In some embodiments, the image sensor 24 uses a video graphics array (video graphics array, VGA) with a resolution of 640×480. Assuming that the light source 13 includes 10 light emitting units 131, the image sensor 24 correspondingly includes 10 light sensing units 2411. Each light sensing unit 2411 has a resolution of 640×48. In this case, the quantity of units of the time-to-digital converter may be 640×48.

The following describes, with reference to schematic diagrams, a working principle of obtaining 3D contour information of a local region of the target object by the foregoing TOF apparatus 10.

Figure 19:
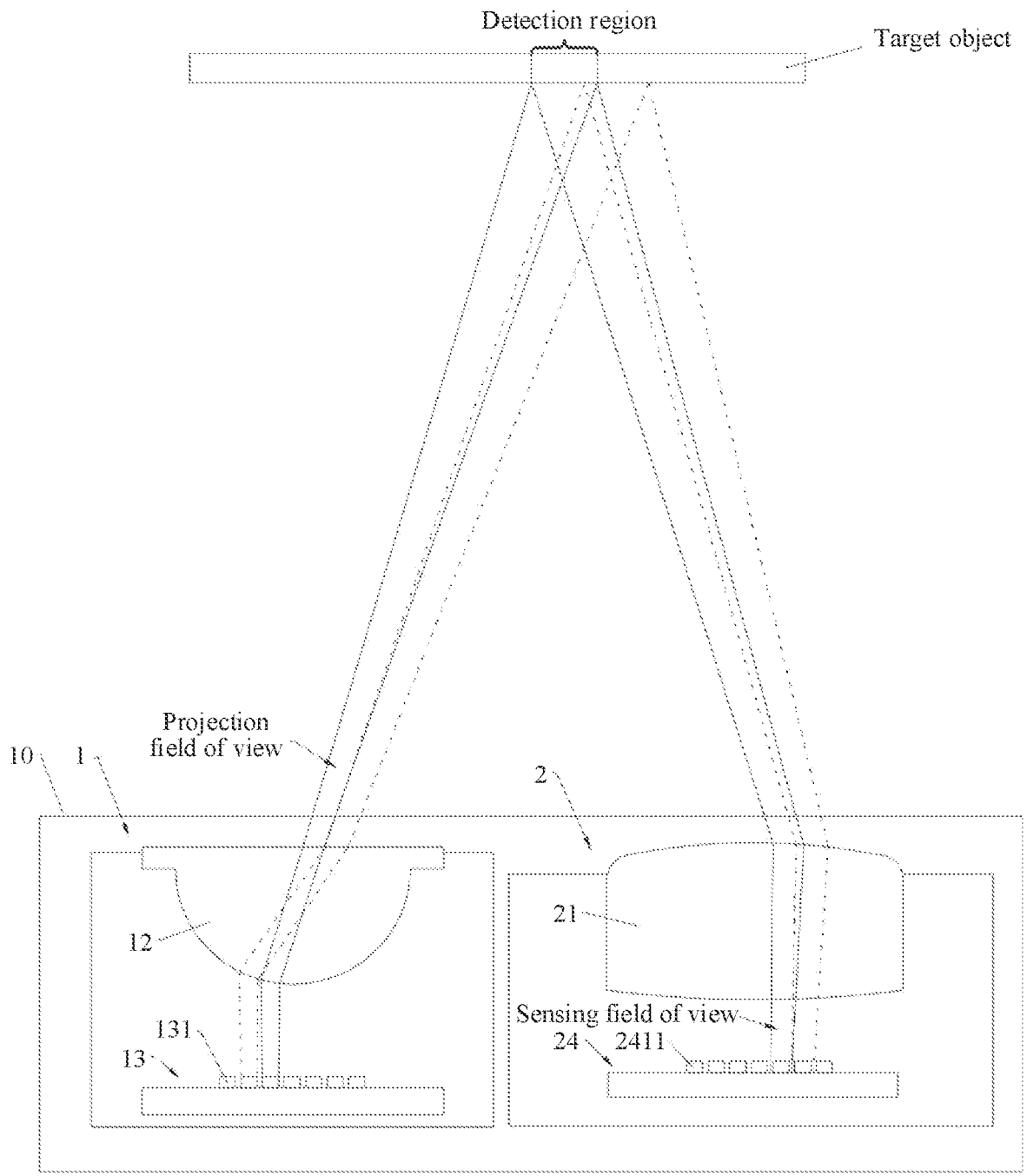
FIG. 19 is a schematic diagram of an application of the TOF apparatus shown in FIG. 4.
Figure 20:
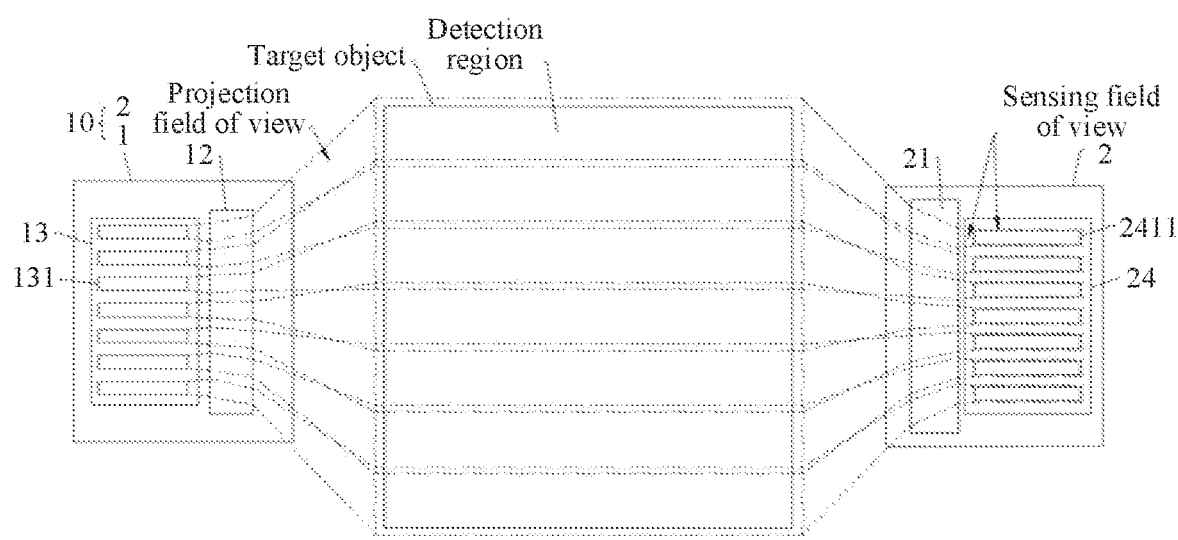
FIG. 20 is another schematic diagram of the application of the TOF apparatus shown in FIG. 4.

Refer to FIG. 19 and FIG. 20. FIG. 19 is a schematic diagram of an application of the TOF apparatus 10 shown in FIG. 4, and FIG. 20 is another schematic diagram of the application the TOF apparatus 10 shown in FIG. 4. FIG. 19 briefly shows a structure and an application scenario of the TOF apparatus 10, and FIG. 20 briefly shows a basic composition and an application scenario of the TOF apparatus 10. It may be understood that optical paths shown in FIG. 19 and FIG. 20 are brief schematic diagrams, and do not constitute a limitation on an actual optical path. In actual use, the TOF apparatus 10 may have another optical path. This is not strictly limited in this application.

In this application, the light source 13 of the transmitter 1 includes a plurality of light emitting units 131, and a drive chip (not shown in the figure) is configured to turn on the plurality of light emitting units 131 in turn according to a specific time sequence. An optical element 12 is located on light emitting paths of the plurality of light emitting units 131, and the optical element 12 is configured to enable light emitted by the plurality of light emitting units 131 to form a plurality of projection fields of view in a one-to-one correspondence. The plurality of projection fields of view are for covering a target object. The target object is located in a detection range of the TOF apparatus 10, and the detection range of the TOF apparatus 10 is greater than 10 centimeters.

A camera lens 21 of the receiver 2 is configured to receive light reflected by the target object and form a plurality of sensing fields of view. The plurality of sensing fields of view are in a one-to-one correspondence with the plurality of projection fields of view. An image sensor 24 is located on a light emitting side of the camera lens 21. The image sensor 24 includes a plurality of light sensing units 2411 and a logic control circuit (not shown in the figure), the plurality of sensing fields of view cover the plurality of light sensing units 2411 in a one-to-one correspondence, the logic control circuit is configured to start the plurality of light sensing units 2411 in turn according to a specific time sequence, and a start time sequence of each light sensing unit 2411 is the same as a turn-on time sequence of a corresponding light emitting unit 131.

For example, the plurality of light emitting units 131 of the light source 13 include a first light emitting unit, a second light emitting unit, . . . , and a $K^{th}$ light emitting unit, where K is a positive integer greater than 2. Light emitted by the plurality of light emitting units 131 forms a plurality of projection fields of view after passing through the optical element 12. The plurality of projection fields of view include a first projection field of view, a second projection field of view, . . . , and a $K^{th}$ projection field of view that are in a one-to-one correspondence with the plurality of light emitting units 131. The plurality of projection fields of view cover a plurality of detection regions of the target object, the plurality of detection regions include a first detection region, a second detection region, . . . , and a $K^{th}$ detection region that are in a one-to-one correspondence with the plurality of projection fields of view, and the plurality of detection regions jointly form the target object. After being reflected by the target object, light emitted by the transmitter 1 is received by the camera lens 21. After the reflected light passes through the camera lens 21, a plurality of sensing fields of view are formed, where the plurality of sensing fields of view include a first sensing field of view, a second sensing field of view, . . . , and a $K^{th}$ sensing field of view that are in a one-to-one correspondence with the plurality of detection regions. The plurality of light sensing units 2411 include a first light sensing unit, a second light sensing unit, . . . , and a $K^{th}$ light sensing unit that are in a one-to-one correspondence with the plurality of sensing fields of view, and the plurality of sensing fields of view cover the plurality of light sensing units 2411 in a one-to-one correspondence. In short, the plurality of light emitting units 131, the plurality of projection fields of view, the plurality of detection regions of the target object, the plurality of sensing fields of view, and the plurality of light sensing units 2411 are disposed in groups in a one-to-one correspondence.

In a detection process of the TOF apparatus 10, the drive chip turns on the plurality of light emitting units 131 according to a specific time sequence, the logic control circuit starts the plurality of light sensing units 2411 according to a specific time sequence, and a start time sequence of each light sensing unit 2411 is the same as a turn-on time sequence of a corresponding light emitting unit 131. For example, when the drive chip turns on the first light emitting unit, the logic control circuit starts the first light sensing unit; when the drive chip turns on the second light emitting unit, the logic control circuit starts the second light sensing unit; . . . ; and when the drive chip turns on the $K^{th}$ light emitting unit, the logic control circuit starts the $K^{th}$ light sensing unit.

In this application, the TOF apparatus 10 obtains the 3D contour information of the plurality of detection regions of the target object in a manner in which the transmitter 1 performs region-based turning-on and the receiver 2 performs region-based detection. The TOF apparatus 10 is electrically connected to a processor of the electronic device 100. The processor can form a local 3D image of the target object based on the 3D contour information of each detection region, and then splices a plurality of local 3D images, to obtain a 3D image of the target object. In other words, the processor 106 can form the 3D image of the target object based on an output signal of the TOF apparatus 10.

In some embodiments, the target object has a plurality of detection regions, and the TOF apparatus 10 separately obtains 3D contour information of the plurality of detection regions through a plurality of times of detection. In one detection process, a light emitting unit 131 of the transmitter 1 repeatedly flashes for thousands of times at a fixed frequency, and a corresponding light sensing unit 2411 of the image sensor 24 of the receiver 2 is continuously in a started state, to complete exposure of a corresponding detection region. The receiver 2 sends a plurality of time-of-flight distribution histograms to the processor of the electronic device 100. Then, next detection is started until exposure of the plurality of detection regions of the target object is completed. The processor forms the local 3D image of the detection region according to the time-of-flight distribution histogram formed during each exposure, and then splices the plurality of local 3D images to form the 3D image of the target object, to complete detection and capturing of a frame of image.

In some embodiments, as shown in FIG. 19 and FIG. 20, two adjacent projection fields of view form two adjacent detection regions on the target object, and the two detection regions are partially staggered and partially overlapped. In this case, an overlapped part of the two adjacent detection regions form redundancy, so that a risk of insufficient detection precision caused by a factor such as an assembly error of the TOF apparatus 10 can be reduced, and a black edge region is avoided at an intersection location of the two adjacent detection regions, so that the TOF apparatus 10 has high detection precision and better imaging quality.

A proportion of a staggered part of two adjacent detection regions is greater than a proportion of the overlapped part of the two detection regions. For example, the proportion of the overlapped part of the two adjacent detection regions may be approximately within a range of 5% to 20%.

Figure 21:
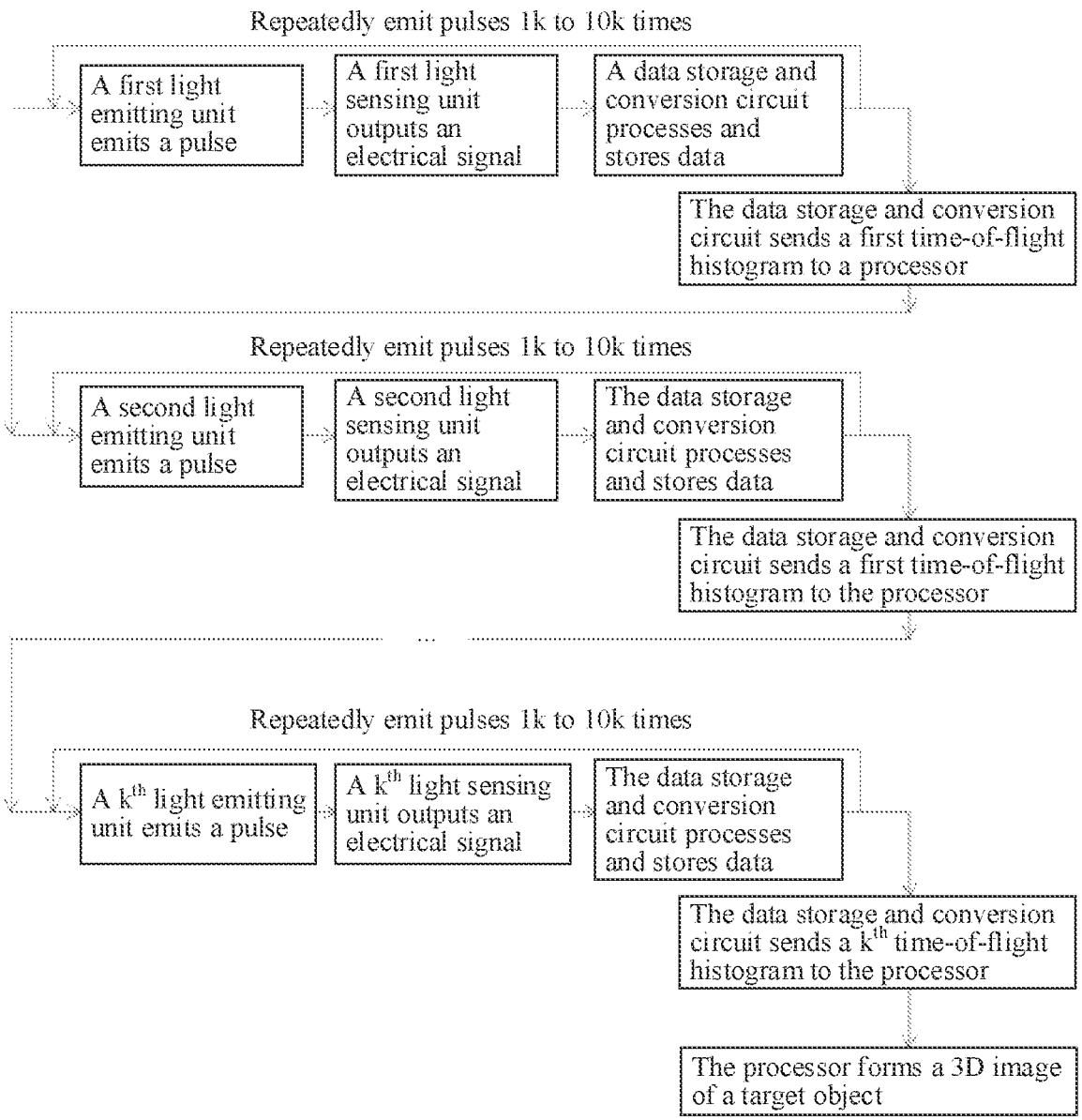
FIG. 21 is a schematic diagram of a working procedure of forming a 3D image by an electronic device according to an embodiment of this application.

Refer to FIG. 21. FIG. 21 is a schematic diagram of a working procedure of forming a 3D image by an electronic device according to an embodiment of this application. The electronic device includes the TOF apparatus shown in the foregoing embodiments.

In some embodiments, a process in which the TOF apparatus of the electronic device detects one detection region of the target object may include 1 k to 10 k flash detection processes. One flash detection process may include: The light emitting unit emits a first pulse; the light sensing unit is in the started state and the light sensing unit converts an optical signal sensed by the light sensing unit into an electrical signal and outputs the electrical signal; and a data storage and conversion circuit receives the electrical signal, and the data storage and conversion circuit processes and stores data. After the TOF apparatus completes the 1 k to 10 k flash detection processes, the data storage and conversion circuit sends the time-of-flight histogram to the processor of the electronic device, so that the detection process is performed.

A pulse width of a pulse of the light emitting unit may be within a range from 1 nanosecond to 5 nanoseconds.

A plurality of time-of-flight histograms are output in each detection process, and the plurality of time-of-flight histograms are in a one-to-one correspondence with a plurality of single-photon detectors in one light sensing unit. The processor can form, based on the plurality of time-of-flight histograms, a local 3D image of the target object corresponding to the light sensing unit.

For example, the TOF apparatus may sequentially detect the plurality of detection regions according to a specific time sequence. In each detection process, a corresponding time-of-flight histogram is output to the processor. The processor forms the local 3D image of the target object based on the time-of-flight histogram, and then splices the plurality of local 3D images to form the 3D image of the target object. For a specific process, refer to FIG. 21. Details are not described herein again.

In conclusion, in this application, the TOF apparatus uses a manner of region-based turning-on and region-based detection, and detects local regions of the target object for a plurality of times, to detect all regions of the target object. Therefore, a peak current can be effectively shared in the plurality of times of detection of the TOF apparatus, and each detection process of the TOF apparatus can be implemented by using only a low peak current. Therefore, when the electronic device can provide a specific peak current, the TOF apparatus in this embodiment can implement detection at a longer distance, and the TOF apparatus and the electronic device have a wider detection range and can also be better applicable to indoor environment and outdoor environment detection. In addition, an effective power per unit area of the TOF apparatus is also high, which helps improve a resolution of the TOF apparatus, so that the TOF apparatus implements high-resolution detection.

It should be understood that, in a conventional TOF apparatus, light emitted by a transmitter is easily directly reflected back to a receiver by a component inside the electronic device, a sealing gap, or the like, causing an image sensor of the receiver to be incorrectly triggered. However, after the image sensor is incorrectly triggered, because a single-photon detector of the image sensor has a dead time (dead time), short-distance ranging is likely to fail, and power consumption is wasted. To avoid this problem, the TOF apparatus in this embodiment of this application may use a design solution of delaying startup at a receiver, so that startup at the image sensor is later than startup at a light source, and a time period in which a crosstalk problem may occur is skipped, to reduce a risk of crosstalk occurrence and improve detection precision. The following provides an example for description.

Figure 22:
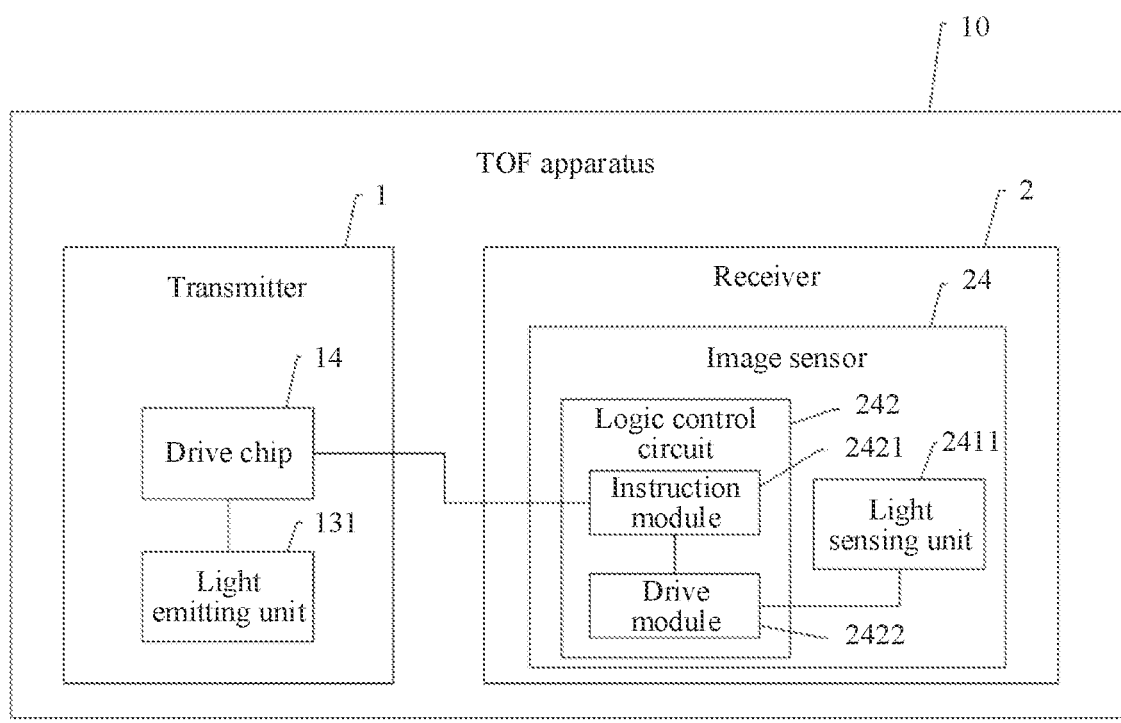
FIG. 22 is a schematic block diagram of a partial structure of the TOF apparatus shown in FIG. 4.

Refer to FIG. 22. FIG. 22 is a schematic block diagram of a partial structure of the TOF apparatus 10 shown in FIG. 4.

In some embodiments, a logic control circuit 242 of an image sensor 24 of the receiver 2 is electrically connected to a drive chip 14 of the transmitter 1. The logic control circuit 242 includes an instruction module 2421 and a drive module 2422. The drive module 2422 is electrically connected to the instruction module 2421. The instruction module 2421 is configured to send a turn-on instruction to the drive chip 14, where the turn-on instruction indicates the drive chip 14 to turn on a preset light emitting unit 131. The drive module 2422 is configured to start the light sensing unit 2411. For example, the drive module 2422 is configured to start a preset light sensing unit 2411 with a delay of 0.1 ns to 1 ns, where the preset light sensing unit 2411 corresponds to the preset light emitting unit 131.

In this embodiment, because the logic control circuit 242 of the image sensor 24 controls the light sensing unit 2411 to start with a delay of 0.1 ns to 1 ns, the light sensing unit 2411 skips a time period in which a crosstalk problem may occur. Therefore, a problem that the image sensor 24 is incorrectly triggered due to short-distance clutter light can be avoided, and a risk of crosstalk occurrence is reduced, to improve the detection precision of the TOF apparatus 10.

The logic control circuit 242 may send the turn-on instruction to the drive chip 14 through low-voltage differential signaling (low-voltage differential signaling, LVDS).

It may be understood that, in the foregoing embodiments, the plurality of light emitting units are arranged in an N×1 manner, and the plurality of detection fields of view of the transmitter, the plurality of detection regions of the target object, the plurality of sensing fields of view of the receiver, and the plurality of light sensing units of the image sensor may be correspondingly arranged in the N×1 manner. In some other embodiments, the plurality of light emitting units may alternatively be arranged in an N×M manner, where M and N are integers greater than or equal to 2. In this case, the plurality of detection fields of view of the transmitter, the plurality of detection regions of the target object, the plurality of sensing fields of view of the receiver, and the plurality of light sensing units of the image sensor may be correspondingly presented in the N×M arrangement manner.

It may be understood that in the foregoing embodiments, the TOF apparatus is implemented by using a direct time of flight technology. In some other embodiments, the TOF apparatus in this embodiment may alternatively be implemented by using an indirect time of flight (indirect time of flight, ITOF) technology. A working principle of the indirect time of flight technology is: A phase offset between a waveform of an optical signal emitted by a transmitter and a waveform of an optical signal received by a receiver is calculated, and then a distance between a target object and a TOF apparatus is calculated based on the phase offset.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A time of flight (TOF) apparatus, comprising a transmitter and a receiver, wherein:
   the transmitter comprises:
      a light source comprising a plurality of light emitting units;
      a drive chip electrically connected to the plurality of light emitting units, and the drive chip is configured to turn on the plurality of light emitting units in a predetermined time sequence; and
      an optical element, located on light emitting paths of the plurality of light emitting units, wherein the optical element is configured to enable light emitted by the plurality of light emitting units to form a plurality of projection fields of view in a one-to-one correspondence for covering a target object;

wherein the plurality of light emitting units are arranged in a first direction, each light emitting unit extends in a second direction perpendicular to the first direction, and an angle of view of a single light emitting unit shrinks in the first direction and expands in the second direction after passing through the optical element; and wherein angles of view of the plurality of projection fields of view in the first direction are in a range of 65° to 70°, and angles of view of the plurality of projection fields of view in the second direction are in a range of 50° to 60°; and the receiver comprises:

a camera lens, configured to receive light reflected by the target object and form a plurality of sensing fields of view corresponding to the plurality of projection fields of view; and an image sensor, located on a light emitting side of the camera lens, wherein the image sensor comprises a logic control circuit and a plurality of light sensing units corresponding to the plurality of light emitting units, the plurality of sensing fields of view each covers one of the plurality of light sensing units, the logic control circuit is configured to start the plurality of light sensing units according to a predetermined time sequence, and a start time of each of the plurality of light sensing units is same as a turn-on time of a corresponding light emitting unit.

2. The TOF apparatus according to claim 1, wherein two adjacent projection fields of view form two adjacent detection regions on the target object, and the two adjacent detection regions are partially staggered and partially overlapped.

3. The TOF apparatus according to claim 2, wherein a proportion of a staggered part of the two adjacent detection regions is greater than a proportion of an overlapped part of the two adjacent detection regions.

4. The TOF apparatus according to claim 1, wherein the light source and the drive chip are disposed in a stacked manner, and a non-light emitting side of the light source is fastened to the drive chip.

5. The TOF apparatus according to claim 4, wherein the light source comprises an anode pad and a cathode pad, the anode pad is located on a light emitting side of the light source, and the cathode pad is located on the non-light emitting side of the light source; and the drive chip comprises a first pad and a second pad, wherein the first pad is located around the light source and on a side of the drive chip close to the light source, the first pad is connected to the anode pad through a conductive wire, the second pad is located on the side of the drive chip close to the light source and is disposed facing the non-light emitting side of the light source, and the second pad is connected to the cathode pad through a conductive adhesive.

6. The TOF apparatus according to claim 5, wherein each light emitting unit comprises two anode pads, and the two anode pads are respectively located at two ends of the light emitting unit; and the first pad is one of a plurality of first pads divided in groups of two, each group of first pads corresponds to one light emitting unit, and two first pads in a same group are respectively located on two sides of a corresponding light emitting unit and are respectively connected to two anode pads of the corresponding light emitting unit.

7. The TOF apparatus according to claim 1, wherein the transmitter further comprises:

a first circuit board, having a through hole; and a first reinforcement plate, fastened on a side of the first circuit board and covers the through hole, wherein the drive chip is at least partially located in the through hole, and a side of the drive chip away from the light source is fastened on the first reinforcement plate.

8. The TOF apparatus according to claim 1, wherein the logic control circuit is electrically connected to the drive chip, and the logic control circuit is configured to:

send a turn-on instruction to the drive chip, wherein the turn-on instruction instructs the drive chip to turn on a preset light emitting unit; and start a preset light sensing unit with a delay of 0.1 ns to 1 ns, wherein the preset light sensing unit corresponds to the preset light emitting unit.

9. The TOF apparatus according to claim 1, wherein the receiver further comprises:

a second circuit board fastened to a non-light sensing side of the image sensor;

a third reinforcement plate having one or more vias and fastened on a side of the second circuit board away from the image sensor; and a plurality of second components located in the one or more vias and are fastened on the second circuit board (, wherein projections of the plurality of second components on the second circuit board at least partially overlap a projection of the image sensor on the second circuit board.

10. An electronic device, comprising a processor and a time of flight (TOF) apparatus, wherein the processor is electrically connected to the TOF apparatus and configured to form a 3D image of a target object based on an output signal of the TOF apparatus, wherein the TOF apparatus comprises a transmitter and a receiver, and wherein:

the transmitter comprises:

a light source comprising a plurality of light emitting units;

a drive chip electrically connected to the plurality of light emitting units, and the drive chip is configured to turn on the plurality of light emitting units in a predetermined time sequence; and an optical element, located on light emitting paths of the plurality of light emitting units, wherein the optical element is configured to enable light emitted by the plurality of light emitting units to form a plurality of projection fields of view in a one-to-one correspondence for covering a target object;

wherein the plurality of light emitting units are arranged in a first direction, each light emitting unit extends in a second direction perpendicular to the first direction, and an angle of view of a single light emitting unit shrinks in the first direction and expands in the second direction after passing through the optical element; and wherein angles of view of the plurality of projection fields of view in the first direction are in a range of 65° to 70°, and angles of view of the plurality of projection fields of view in the second direction are in a range of 50° to 60°; and the receiver comprises:

a camera lens, configured to receive light reflected by the target object and form a plurality of sensing fields of view corresponding to the plurality of projection fields of view; and an image sensor, located on a light emitting side of the camera lens, wherein the image sensor comprises a logic control circuit and a plurality of light sensing units corresponding to the plurality of light emitting units, the plurality of sensing fields of view each covers one of the plurality of light sensing units, the logic control circuit is configured to start the plurality of light sensing units according to a predetermined time sequence, and a start time of each of the plurality of light sensing units is same as a turn-on time of a corresponding light emitting unit.

11. The electronic device according to claim 10, wherein two adjacent projection fields of view form two adjacent detection regions on the target object, and the two adjacent detection regions are partially staggered and partially overlapped.

12. The electronic device according to claim 11, wherein a proportion of a staggered part of the two adjacent detection regions is greater than a proportion of an overlapped part of the two adjacent detection regions.

13. The electronic device according to claim 10, wherein the light source and the drive chip are disposed in a stacked manner, and a non-light emitting side of the light source is fastened to the drive chip.

14. The electronic device according to claim 13, wherein the light source comprises an anode pad and a cathode pad, the anode pad is located on a light emitting side of the light source, and the cathode pad is located on the non-light emitting side of the light source; and the drive chip comprises a first pad and a second pad, wherein the first pad is located around the light source and on a side of the drive chip close to the light source, the first pad is connected to the anode pad through a conductive wire, the second pad is located on the side of the drive chip close to the light source and is disposed facing the non-light emitting side of the light source, and the second pad is connected to the cathode pad through a conductive adhesive.

15. The electronic device according to claim 14, wherein each light emitting unit comprises two anode pads, and the two anode pads are respectively located at two ends of the light emitting unit; and the first pad is one of a plurality of first pads divided in groups of two, each group of first pads corresponds to one light emitting unit, and two first pads in a same group are respectively located on two sides of a corresponding light emitting unit and are respectively connected to two anode pads of the corresponding light emitting unit.

16. The electronic device according to claim 10, wherein the transmitter further comprises:

a first circuit board, having a through hole; and a first reinforcement plate, fastened on a side of the first circuit board and covers the through hole, wherein the drive chip is at least partially located in the through hole, and a side of the drive chip away from the light source is fastened on the first reinforcement plate.

* * * * *

UNITED STATES PATENT AND TRADEMARK OFFICE
CERTIFICATE OF CORRECTION

Page 1 of 1

PATENT NO. : 12,372,657 B2
APPLICATION NO. : 18/256535
DATED : July 29, 2025
INVENTOR(S) : Ziang Zhao et al.

It is certified that error appears in the above-identified patent and that said Letters Patent is hereby corrected as shown below:

In the Claims

In Column 26, In Line 27-28, In Claim 9, delete "board (," and insert -- board, --.

Signed and Sealed this
Sixteenth Day of December, 2025

John A. Squires
*Director of the United States Patent and Trademark Office*